US012668657B2

(12) United States Patent
Noonan et al.

(10) Patent No.: US 12,668,657 B2
(45) Date of Patent: Jun. 30, 2026

(54) POLYNORBORNENE-BASED POLYCATIONS

(71) Applicant: CARNEGIE MELLON UNIVERSITY, Pittsburgh, PA (US)

(72) Inventors: Kevin Noonan, Pittsburgh, PA (US); Ryan Selhorst, Dayton, OH (US); Jamie Gaitor, Coraopolis, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 612 days.

(21) Appl. No.: 18/205,107

(22) Filed: Jun. 2, 2023

(65) Prior Publication Data
US 2023/0323003 A1 Oct. 12, 2023

Related U.S. Application Data

(62) Division of application No. 17/243,877, filed on Apr. 29, 2021, now Pat. No. 11,708,447.

(60) Provisional application No. 63/017,438, filed on Apr. 29, 2020.

(51) Int. Cl.
C08F 299/00 (2006.01)
C08F 232/08 (2006.01)
C08F 287/00 (2006.01)

(52) U.S. Cl.
CPC .......... C08F 299/00 (2013.01); C08F 232/08 (2013.01); C08F 287/00 (2013.01)

(58) Field of Classification Search
None
See application file for complete search history.

(56) References Cited

FOREIGN PATENT DOCUMENTS

WO WO-2019191225 A1 * 10/2019 .............. C08L 53/00

OTHER PUBLICATIONS

Kim, D, et al., "Living Vinyl Addition Polymerization of Substituted Norbornenes by a t-Bu3P-Ligated Methylpalladium Complex", ACS Macro Lett., 4, 3, 327 (2015).
Muller, K et al., "Synthesis and Rheological Properties of Poly(5-n-hexylnorbornene)," Macromol. Chem. Phys. 2006, 207, 193-200.

Mandal, M. et al., Anionic Multiblock Copolymer Membrane Based on Vinyl Addition Polymerization of Norbornenes: Applications in Anion-Exchange Membrane Fuel Cells. J. Membrane Sci. 2019, 570-571, 394-402.
Mandal, M. et al., Highly Conductive Anion-Exchange Membranes Based on Cross-Linked Poly(norbornene): Vinyl Addition Polymerization. ACS Appl. Energy Mater. 2019, 2, 2447-2457.
Yamashita, M. et al., "Syntheses and Structures of Bulky Monophosphine-Ligated Methylpalladium Complexes: Application to Homo- and Copolymerization of Norbornene and/or Methoxycarbonylnorbornene" Organometallics, 2006, 25, 4588-4595.
Martínez-Arranz, S. et al., "Versatile Route to Functionalized Vinylic Addition Polynorbornenes" Macromolecules, 2010, 43 (18), 7482-7487.
Huang, Garrett et al, Composite Poly(norbornene) Anion Conducting Membranes for Achieving Durability,Water Management and High Power(3.4 W/cm2) in Hydrogen/Oxygen Alkaline Fuel Cells, Journal of The Electrochemical Society, 166 (10), (2019), F637-F644.
Schwesinger, Reinhard et al, Extremely Strong, Uncharged Auxiliary Bases; Monomeric and Polymer-Supported Polyaminophosphazenes (P2-P5), Liebigs Ann. 1996, 1055-1081.
Mandal, Mrinmay et al., Poly(norbornene) anion conductive membranes: homopolymer, block copolymer and random copolymer properties and performance, J. Mater. Chem. A, 2020, 8, 17568-17578.
Treichel, Megan et al., Exploring the Effects of Bulky Cations Tethered to Semicrystalline Polymers: The Case of Tetraaminophosphoniums with Ring-Opened Polynorbornenes, Macromolecules 2020, 53, 8509-8518.

* cited by examiner

Primary Examiner — Christopher M Rodd
(74) Attorney, Agent, or Firm — BARTONY & ASSOCIATES LLC

(57) ABSTRACT

A multiblock, cationic-functionalized norbornene copolymer is formed by a process including performing a vinyl addition polymerization in the presence of a metal catalyst of a first norbornene monomer substituted with a first alkyl group and a second norbornene monomer substituted with a second alkyl group by adding a predetermined amount of the first norbornene monomer and a predetermined amount of the second norbornene monomer sequentially to the reaction to form blocks of an intermediate norbornene multiblock copolymer. The second alkyl group includes a substituent which undergoes a reaction with a precursor for a cationic group having a volume less than 0.25 cm³/mol. The process further includes reacting the precursor for the cationic group with the intermediate norbornene multiblock copolymer to form the multiblock, cationic-functionalized norborene copolymer.

16 Claims, 9 Drawing Sheets

R and $R_a$ are independently C1-C20 alkyl
X is group suitable to undergo nucleophilic substitution (e.g., halo (Cl, Br or I), mesylate, or tosylate)

Table 1

| Entry | Mol % BrBuNB[a] | $M_n$[b] (kg/mol) | $Đ$[b] | σ 22 °C[c] (mS/cm) | σ 80 °C (mS/cm) | IEC[d] (meq/g) | Water Uptake[e] (%) | Hyd. Number[f] (λ) | d-spacing (nm)[g] |
|---|---|---|---|---|---|---|---|---|---|
| Diblock | 29 | 85 | 1.21 | 41 ± 4 | 79 ± 3 | 1.70 | 80 | 26 | 65.4 |
| Triblock | 32 | 100 | 1.18 | 43 ± 8 | 84 ± 3 | 1.60 | 57 | 20 | 36.5 |
| Tetrablock | 33 | 118 | 1.18 | 55 ± 6 | 78 ± 5 | 1.67 | 85 | 28 | 29.9 |
| Pentablock | 32 | 113 | 1.34 | 58 ± 7 | 98 ± 2 | 1.67 | 75 | 25 | 29.9 |
| Statistical | 29 | 108 | 1.12 | 30 ± 3 | 61 ± 2 | 1.61 | 30 | 10 | - |

[a] The targeted mol % of BrBuNB (33%) was compared to actual value determined by $^1$H NMR spectroscopy (–CH$_2$-Br of BrBuNB to terminal CH$_3$ of hNB). [b] GPC traces were determined in the OH$^-$ form using electrochemical impedance spectroscopy (EIS). Error analysis was completed from the variance in conductivity and variability in film thickness. [d] The theoretical IEC for all copolymers is ~1.72 meq/g. The experimental IECs were determined by back-titration of the polymer films in the hydroxide form (Supporting Information). [e] Water uptake was determined using gravimetric analysis. [f] Hydration values were determined by the equation λ = [1000×WU]/[IEC×18]. [g] d-spacing was measured from SAXS patterns.

Fig. 1D

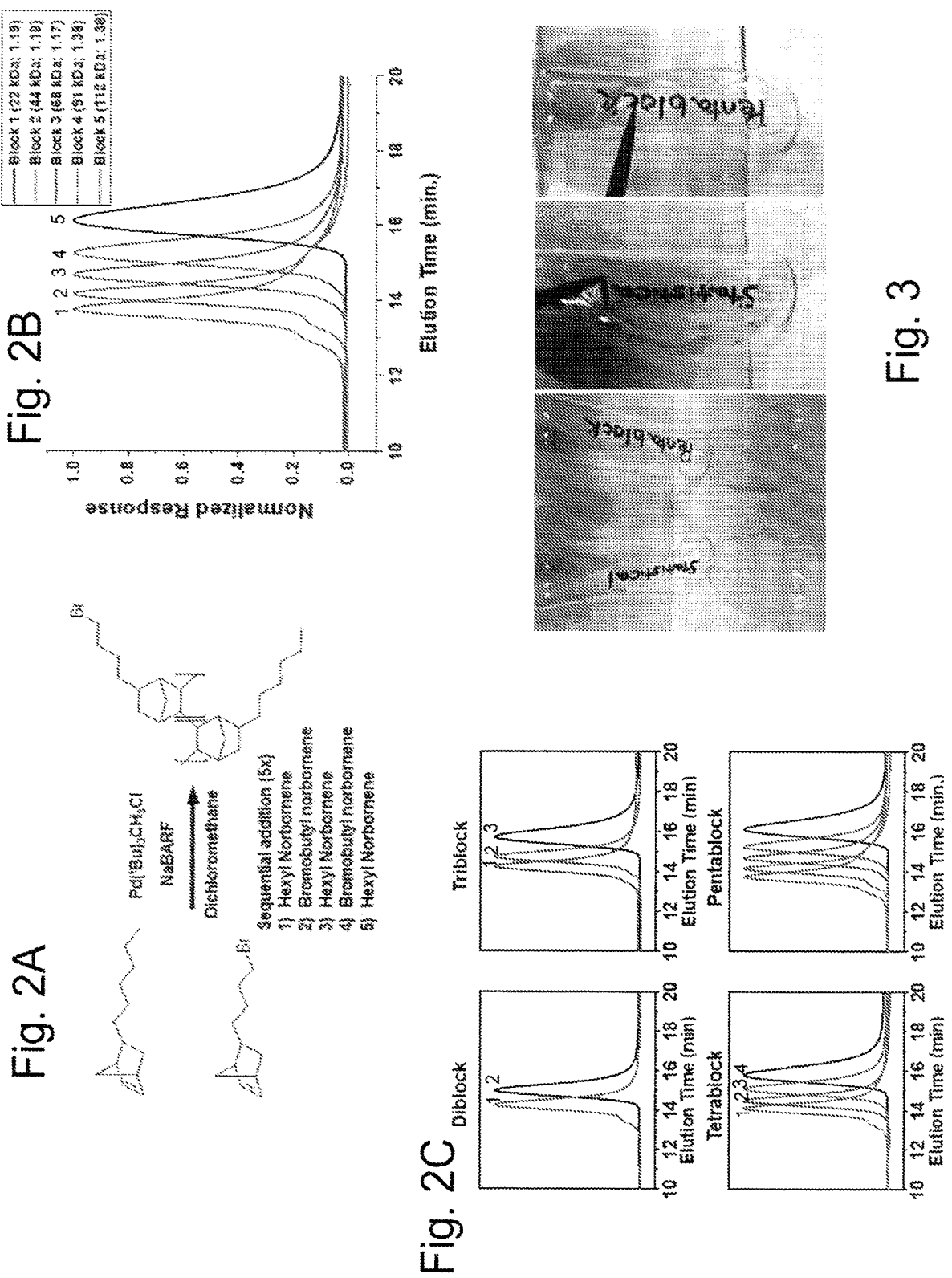

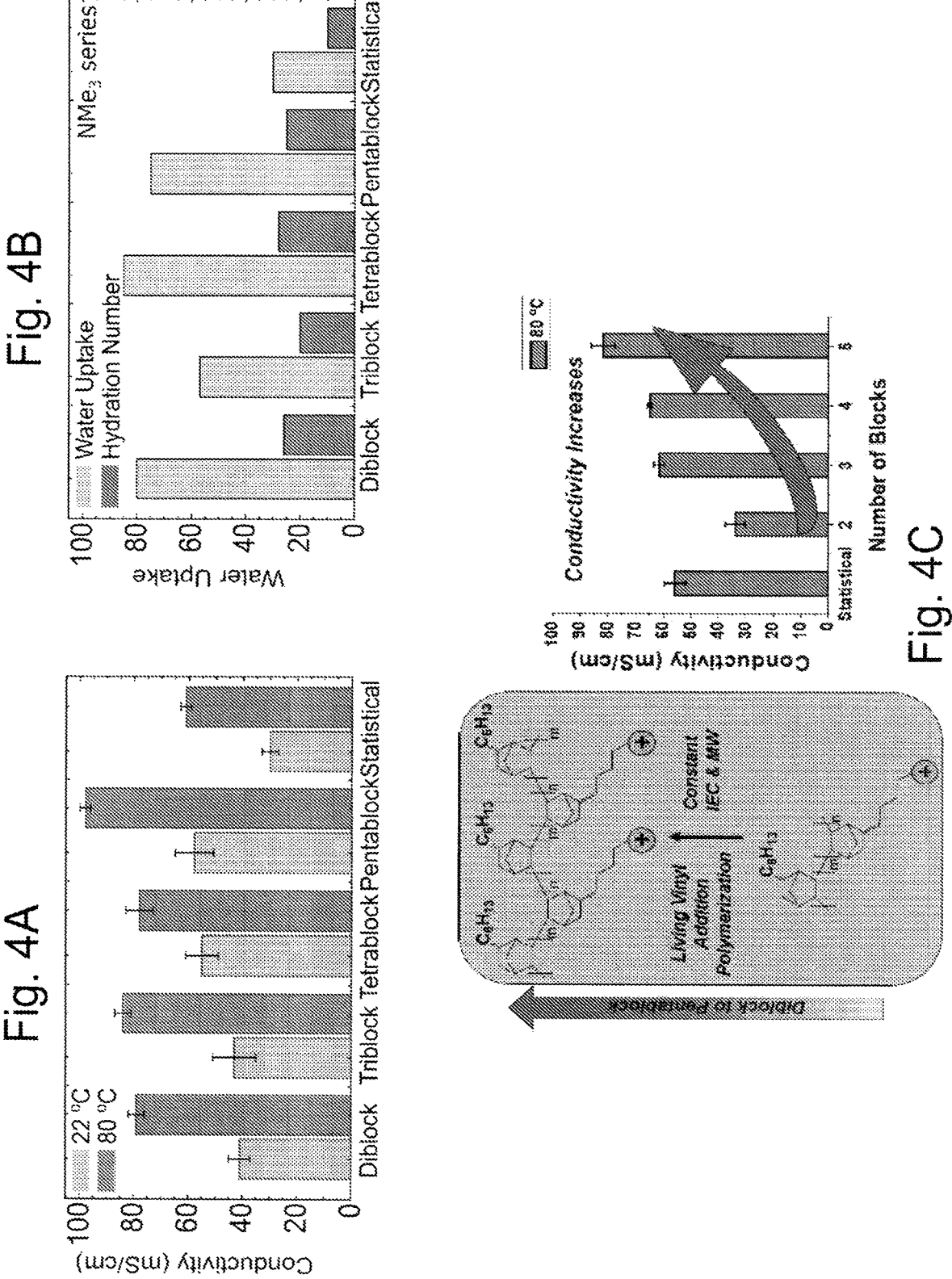

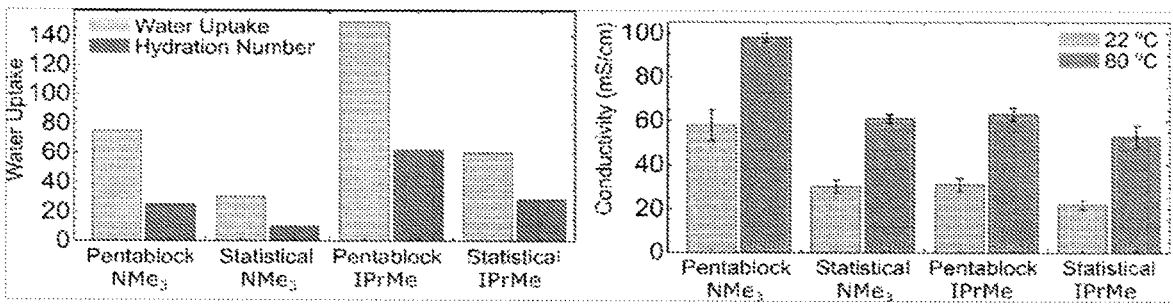
Fig. 6C                              Fig. 6D
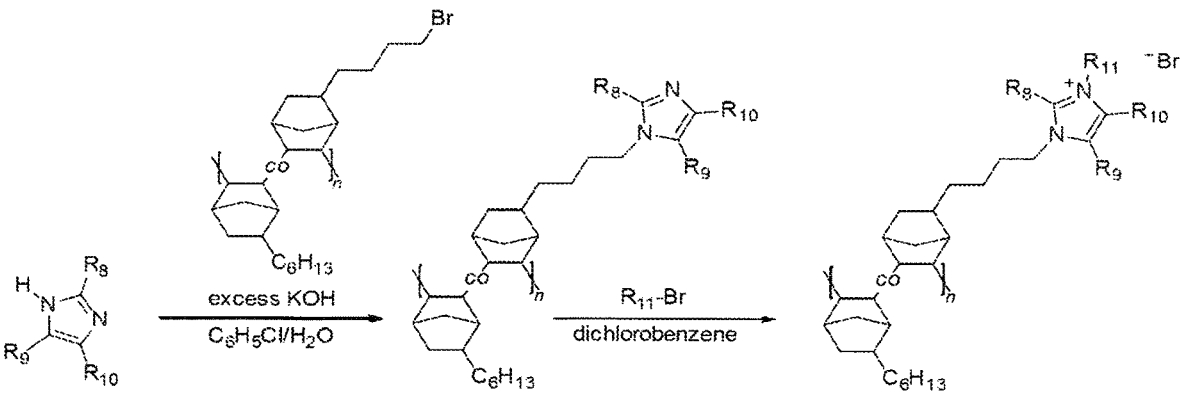
$R_8$, $R_9$, $R_{10}$, and $R_{11}$, may independently be
C1-C12 alkyl (cyclic, branched or linear) or
phenyl with or without substituents on the ring
Fig. 7

POLYNORBORNENE-BASED POLYCATIONS

CROSS-REFERENCE TO RELATED APPLICATIONS

This application is a divisional patent application of U.S. patent application Ser. No. 17/243,877, filed Apr. 29, 2021, which claims benefit of U.S. Provisional Patent Application Ser. No. 63/017,438, filed Apr. 29, 2020, the disclosures of which are incorporated herein by reference.

GOVERNMENTAL INTEREST

This invention was made with government support under grant no. DESC0019445 awarded by the Department of Energy (subaward grant no. 859891116315). The U.S. Government has certain rights in this invention.

BACKGROUND

The following information is provided to assist the reader in understanding technologies disclosed below and the environment in which such technologies may typically be used. The terms used herein are not intended to be limited to any particular narrow interpretation unless clearly stated otherwise in this document. References set forth herein may facilitate understanding of the technologies or the background thereof. The disclosure of all references cited herein are incorporated by reference.

Ion-exchange membranes are critical components in electrochemical cells, as they facilitate ion flux between the electrocatalysts. In the last decade, there has been rising interest in membranes which promote the flow of $OH^-$ anions, as these materials can be used in alkaline fuel cells and electrolyzers. Anion-exchange membranes (AEMs) typically are formed from polymers with covalently tethered cationic groups. Their mechanical integrity is governed by the polymer backbone and the ion movement is determined by the cationic side chains.

Achieving high OH conductivity (that is, >80-100 mS/cm) in AEMs often requires relatively large concentrations of cationic groups appended to the polymer, especially compared to the number of charged groups in proton-exchange membranes (PEMs). This difference can be partially attributed to the lower mobility of OH in comparison with $H^+$ in aqueous systems. The increased ion-content in AEMs, which is required to improve performance, has an impact on swelling and mechanical integrity.

Recent studies have demonstrated that crosslink density can be used to control water uptake and conductivity in vinyl addition polynorbornenes. In that regard, a trimethylammonium-based tetrablock copolymer was prepared in such studies. Light crosslinking was indicated to produce a material with high ion conductivity (~200 mS/cm at 80° C.) in an AEM.

Development of fuel cells has generated a lot of attention recently as a result of increased demands for efficient and clean electricity generation. In particular, AEMs offer a promising solution for current demands. Nonetheless, a continuing need exists for making more efficient and longer lasting AEM for fuel cells (for use, for example, in vehicles, including large vehicles such as trains, buses, etc.) and for other uses.

SUMMARY

In one aspect a statistical, cationic-functionalized norbornene copolymer is formed by a process including performing a vinyl addition polymerization in the presence of a metal catalyst of a first norbornene monomer substituted with a first alkyl group and at least a second norbornene monomer substituted with a second alkyl group, to form an intermediate norbornene copolymer. The second alkyl group includes a substituent which undergoes a reaction (for example, a substitution reaction) with a precursor of a cationic group. The process further includes adding the precursor for the cationic group to the intermediate norbornene copolymer to form the cationic-functionalized norborene copolymer. The cationic group has a volume of 0.25 $cm^3$/mol or greater (for example, a phosphonium group or an imidazolium group). In a number of embodiments, the first alkyl group is a C1-C20 alkyl group, and the second alkyl group is a C1-C20 alkyl group. The vinyl addition polymerization may be (but is not required to be) a controlled vinyl addition polymerization.

The substituent of the second alkyl group may, for example, be a halo atom, a mesylate group, or tosylate group. As used herein halo atoms refer to —Cl, —Br or —I. The first alkyl group may, for example, be a C1-C12 alkyl group and the second alkyl group may, for example, independently be a C1-C12 alkyl group.

In a number of embodiments, the intermediate norbornene copolymer has a number average molecular weight above the entanglement molecular weight. The cationic-functionalized norbornene polymer may, for example, have a polydispersity less than 1.5. In a number of embodiments, the cationic-functionalized norbornene polymer includes no crosslinks. The cationic functionalized norbornene polymer may, for example, be solution processable.

In another aspect, a method of synthesizing a statistical, cationic-functionalized norbornene copolymer includes performing a vinyl addition polymerization in the presence of a metal catalyst of a first norbornene monomer substituted with a first alkyl group and at least a second norbornene monomer substituted with a second alkyl group to form an intermediate norbornene copolymer. The second alkyl group includes a substituent which undergoes a reaction (for example, a substitution reaction) with a precursor of a cationic group. The method further includes adding the precursor for the cationic group to the intermediate borbornene copolymer to form the cationic-functionalized norborene copolymer. The cationic group has a volume of 0.25 $cm^3$/mol or greater (for example, a phosphonium group or an imidazolium group). The first alkyl group may, for example, be a C1-C20 alkyl group, and the second alkyl group may, for example, be a C1-C20 alkyl group. Once again, the vinyl addition polymerization may be (but is not required to be) a controlled vinyl addition polymerization.

The substituent of the second alkyl group may, for example, be a halo atom, a mesylate group, or tosylate group. As used herein halo atoms refer to —Cl, —Br or —I. The first alkyl group may, for example, be a C1-C12 alkyl group and the second alkyl group may, for example, independently be a C1-C12 alkyl group.

In a number of embodiments, the intermediate norbornene polymer has a number average molecular weight above the entanglement molecular weight. The cationic-functionalized norborene polymer may, for example, have a polydispersity less than 1.5. In a number of embodiments, the cationic-functionalized norbornene polymer includes no crosslinks. The cationic functionalized norbornene polymer may, for example, be solution processable.

In a number of embodiments, the cationic group is a phosphonium group and the precursor is a phosphazene base. In a number of embodiments, the reaction product of the phosphazene base and the intermediate norborene copolymer is worked up using potassium hexafluorophosphate and converted into a chloride form using an anion-exchange resin.

In a number of embodiments, the cationic group is an imidazolium group and the precursor is an imidazole. In a number of embodiments, the imidazole is reacted with the intermediate norbomene copolymer via phase-transfer chemistry and subsequently converted to the imidazolium via a nucleophilic substitution.

The method may further include casting a film or membrane of the cationic-functionalized norbornene copolymer from solution.

In another aspect, a multiblock, cationic-functionalized norbornene copolymer is formed by a process which includes performing a vinyl addition polymerization (which may be a controlled vinyl addition polymerization) in the presence of a metal catalyst of a first norbornene monomer substituted with a first alkyl group and at least a second norbornene monomer substituted with a second alkyl group by adding a predetermined amount of the first norbornene monomer and a predetermined amount of the second norbornene monomer sequentially to the reaction to form blocks of an intermediate norborene multiblock copolymer. The second alkyl group includes a substituent which undergoes a reaction (for example, a substitution reaction) with a precursor for a cationic group having a volume less than 0.25 cm³/mol. The process further includes reacting the precursor for the cationic group with the intermediate norbornene multiblock copolymer to form the multiblock, cationic-functionalized norborene copolymer. The precursor for the cationic group may, for example, be a precursor for an ammonium cationic group such as a tertiary amine precursor for an ammonium cationic group, and the cationic-functionalized norbornene copolymer may be an ammonium-functionalized norbornene copolymer.

The first alkyl group may be a C1-C20 alkyl group, and the second alkyl group may be a C1-C20. In a number of embodiments, the first alkyl group is a C1-C12 alkyl group, and the second alkyl group is a C1-C12 alkyl group. The multiblock, cation-functionalized norbomene copolymer includes an odd number of blocks, and a first block and a last block of the multiblock, cationic-functionalized norbornene copolymer are formed from the first norbornene monomer. The substituent of the second alkyl group may, for example, be a halo atom, a mesylate group, or tosylate group.

In a number of embodiments, the intermediate norbornene multiblock copolymer has a number average molecular weight above the entanglement molecular weight thereof. The cationic-functionalized norbornene copolymer may, for example, have a polydispersity less than 1.5 or no greater than 1.38.

In a number of embodiments, the multiblock, cationic-functionalized norbornene copolymer includes no cross-links. In a number of embodiments, the multiblock, cationic-functionalized norbornene copolymer is solution processible.

In another aspect, a method of synthesizing a multiblock, cationic-functionalized norbornene copolymer includes performing a vinyl addition polymerization (which may be a controlled vinyl addition polymerization) in the presence of a metal catalyst of a first norbornene monomer substituted with a first alkyl group and at least a second norbornene monomer substituted with a second alkyl group by adding a predetermined amount of the first norbornene monomer and a predetermined amount of the second norbornene monomer sequentially to the reaction to form blocks of an intermediate norborene multiblock copolymer. The second alkyl group includes a substituent which undergoes a reaction (for example, a substitution reaction) with a precursor for the cationic group. The method further includes reacting the precursor for the cationic group with the intermediate norbornene multiblock copolymer to form the multiblock, cationic-functionalized norborene copolymer. The precursor for the cationic group may, for example, be a precursor for an ammonium cationic group such as a tertiary amine precursor for an ammonium cationic group, and the cationic-functionalized norbornene copolymer may be an ammonium-functionalized norbornene copolymer.

The first alkyl group may be a C1-C 20 alkyl group, and the second alkyl group may be a C1-C20. In a number of embodiments, the first alkyl group is a C1-C12 alkyl group, and the second alkyl group is a C1-C12 alkyl group. The multiblock, cation-functionalize norbomene copolymer includes an odd number of blocks, and a first block and a last block of the multiblock, cationic-functionalized norbornene copolymer are formed from the first norbornene monomer. The substituent of the second alkyl group may, for example, be a halo atom, a mesylate group, or tosylate group.

In a number of embodiments, the intermediate norbornene multiblock copolymer has a number average molecular weight above the entanglement molecular weight thereof. The cationic-functionalized norbornene copolymer may, for example, have a polydispersity less than 1.5 or no greater than 1.38.

In a number of embodiments, the multiblock, cationic-functionalized norbornene copolymer includes no cross-links. In a number of embodiments, the multiblock, cationic-functionalized norbomene copolymer is solution processible.

In a number of embodiment, the method further includes casting a film or membrane of the multiblock, ammonium-functionalized norbomene copolymer from solution.

In another aspect, a method of synthesis of a tetrakis (dialkylamino) phosphonium compound in a single reaction vessel, includes reacting phosphorus pentachloride with three equivalents of a first amine, which is a secondary amine, in the presence of an organic base in the reaction vessel and subsequent addition of a second amine, which is a primary amine or a secondary amine, to the reaction vessel. In a number of embodiments, the second amine is a primary amine.

In another aspect, a method of designing cation-functionalized olefinic polymers includes synthesizing a statistical cation-functionalized olefinic copolymer and one or more multiblock cation-functionalized olefinic copolymers, wherein the statistical cation-functionalized olefinic copolymer and the one or more multiblock cation-functionalized olefinic copolymers have similar ionic contents and similar molecular weights, by performing a controlled vinyl addition polymerization in the presence of a metal catalyst of a first olefinic monomer substituted with a first alkyl group and at least a second olefinic monomer substituted with a second alkyl group to first from a statistical intermediate copolymer and one or more of multiblock intermediate copolymers. The second alkyl group includes a substituent which undergoes a reaction (for example, a substitution reaction) with a precursor for a cationic group that has a volume less than 0.25 cm³/mol (for example, an ammonium cationic group). The first alkyl group may be a C1-C20 alkyl group, and the second alkyl group may be a C1-C20. The precursor for the cationic group may, for example, be a precursor for an ammonium cationic group such as a tertiary amine precursor for an ammonium cationic group, and the cationic-functionalized norbornene copolymer may be an ammonium-functionalized norbornene copolymer. The statistical intermediate copolymer is formed by mixing the first olefinic monomer and the second olefinic monomer, and the one or more multiblock intermediate copolymers are formed by adding a predetermined amount of the first olefinic monomer and a predetermined amount of the second olefinic monomer sequentially to form blocks of the intermediate multiblock copolymer. The method further includes reacting the precursor for the cationic group with the intermediate statistical copolymer and with each of the one or more multiblock intermediate copolymers to form the cation-functionalized olefinic statistical copolymer and the one or more cation-functionalized multiblock copolymers.

In a number of embodiments, the first olefinic monomer is a first norbornene monomer and the second olefinic monomer is a second norbornene monomer. The first norbornene monomer may, for example, have the formula:

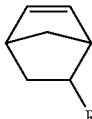

wherein R is a C1-C20 alkyl group and the second norbornene monomer may, for example, have the formula:

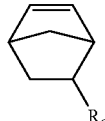

wherein $R_a$ is a C1-C20 alkylene group and X is a halo atom, a mesylate group, or a tosylate group.

The cationic-functionalized norbornene polymer may, for example, have a molecular weight above the entanglement molecular weight. The cation-functionalized norbornene polymer may, for example, have a polydispersity less than 1.5 or not greater than 1.38.

In a number of embodiments, the cation-functionalized norbornene polymer includes no crosslinks, In a number of embodiments, the cation-functionalized norborene polymer is solution processible. The method may, for example, further includes casting a film of the cation-functionalized norborene polymer from solution.

In a further aspect, membrane comprises a statistical, cationic-functionalized (for example, phosphonium-functionalized or imidazolium-functionalize) norbornene copolymer hereof The membrane may, for example, be formed from solution casting of the copolymer.

In still a further aspect, a membrane comprises a multiblock, cationic-functionalized (for example, ammonium-functionalize) norbornene copolymer hereof. The membrane may, for example, be formed from solution casting of the copolymer.

The present devices, systems, methods, and compositions, along with the attributes and attendant advantages thereof, will best be appreciated and understood in view of the following detailed description taken in conjunction with the accompanying drawings.

BRIEF DESCRIPTION OF THE DRAWINGS

FIG. 1D illustrates Table 1 setting forth characterization of representative statistical as well as diblock, triblock, tetrablock and pentablock copolymers hereof.

FIG. 2A illustrates a representative multiblock synthesis of addition polynorbornenes detailing a pentablock copolymer formed from hexyl norborene and bromobutyl norbornene.

FIG. 2B illustrates size exclusion chromatograms (SECs) showing the increase in molecular weight with every block added to the pentablock copolymer of FIG. 2A.

FIG. 2C illustrates size exclusion chromatograms for the diblock, triblock, tetrablock and pentablock copolymers described in Table 1 of FIG. 1D hereof.

FIG. 3 illustrates photographs of the statistical and pentablock copolymer films after reaction with trimethylamine.

FIG. 4A illustrates hydroxide conductivities for the series of copolymers of Table 1 of FIG. 1D measured by electrochemical impedance spectroscopy at 22 and 80° C., wherein conductivity was determined in the OH⁻ form using electrochemical impedance spectroscopy (EIS), the error is the standard deviation over 3 measurements, the theoretical IEC for all copolymers was approximately 1.72 meq/g, and the experimental IECs were determined by back-titration of the polymer film in the hydroxide form.

FIG. 4B illustrates water uptake studies for the copolymer series of Table 1 of FIG. 1D wherein water uptake was determined using gravimetric analysis and hydration values were determined by the equation $\lambda=[1000\times WU]/[IEC\times 18]$.

FIG. 4C illustrates a graph of the trend of hydroxide conductivities with increasing number of blocks for the copolymer series of Table 1 of FIG. 1D.

FIG. 7 illustrates a representative synthetic scheme for post-polymerization modification of the polynorbornene copolymers hereof with an imidazolium cation wherein an imidazole precursor may be attached using phase-transfer chemistry and converted into the imidazolium via a nucleophilic substitution.

DETAILED DESCRIPTION

Figures 1A, 1B:
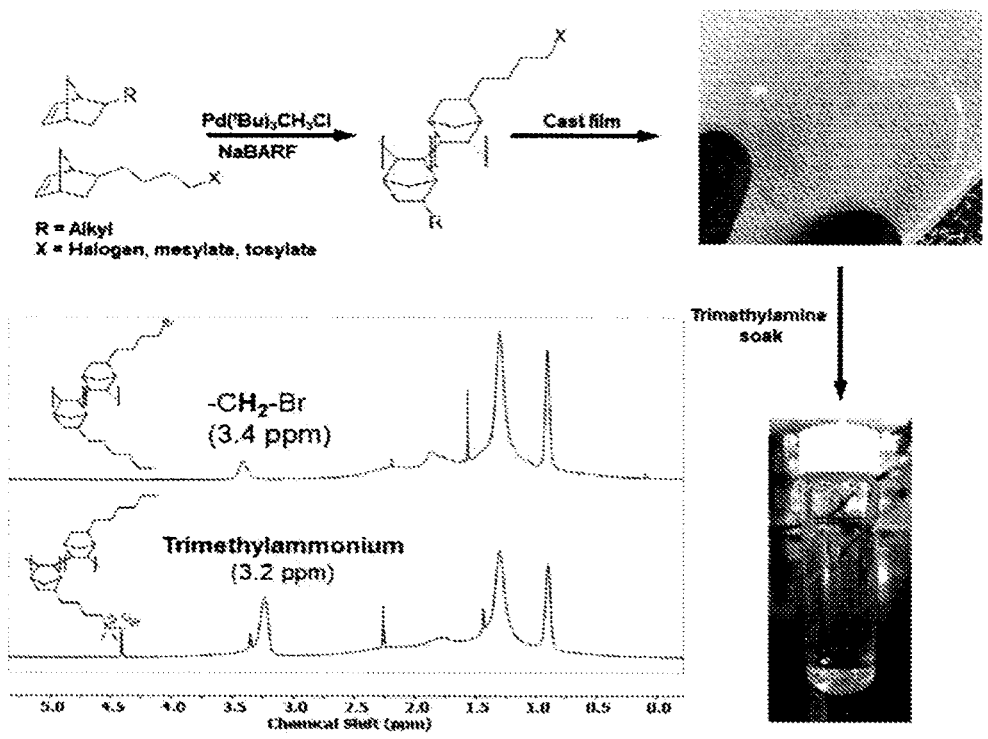
FIG. 1A illustrates a representative embodiment of an overall process of synthesizing, film casting, and post polymerization functionalization of addition-type olefins/polynorbornenes, wherein the bottom left of the figure shows the success of post-functionalizing a statistical bromobutyl norbornene copolymer with $^1H$ NMR spectroscopy before and after reaction with trimethylamine.
FIG. 1B illustrates a representative synthetic scheme for synthesizing representative statistical and multiblock copolymers by controlled vinyl addition polymerization for representative comonomers used in studies hereof wherein the copolymer is functionalized with an ammonium ion after controlled vinyl addition polymerization.

It will be readily understood that the components of the embodiments, as generally described and illustrated in the figures herein, may be arranged and designed in a wide variety of different configurations in addition to the described representative embodiments. Thus, the following more detailed description of the representative embodiments, as illustrated in the figures, is not intended to limit the scope of the embodiments, as claimed, but is merely illustrative of representative embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As used herein and in the appended claims, the singular forms "a" "an", and "the" include plural references unless the context clearly dictates otherwise. Thus, for example, reference to "a monomer" includes a plurality of such monomers and equivalents thereof known to those skilled in the art, and so forth, and reference to "the monomer" is a reference to one or more such monomers and equivalents thereof known to those skilled in the art, and so forth. Recitation of ranges of values herein are merely intended to serve as a shorthand method of referring individually to each separate value falling within the range. Unless otherwise indicated herein, and each separate value, as well as inter- mediate ranges, are incorporated into the specification as if individually recited herein. All methods described herein can be performed in any suitable order unless otherwise indicated herein or otherwise clearly contraindicated by the text.

The term "polymer" or the prefix "poly" (when referring to a particular type of polymer) refers generally to a molecule, the structure of which includes repeat units derived, actually or conceptually, from molecules of low relative molecular mass (monomers). The term "copolymer" refers to a polymer including two or more dissimilar repeat units (including terpolymers—comprising three dissimilar repeat units—etc.). The term "block copolymer" as used herein refers to a copolymer including molecules in which there is a linear arrangement of blocks, wherein a block is a portion of a polymer molecule in which the repeat/monomeric units have at least one constitutional or configurational feature absent from the adjacent portions. A block copolymer may, for example, be a copolymer formed when two monomers are clustered together to form "blocks" of repeat units (for example, a copolymer formed from monomers X and Y such as -XXXXX-YYYYY-XXXXX-YYYYY-XXXXX, wherein -XXXXX- and -YYYYY- are the blocks).

Block copolymers have been explored in AEMs to promote nanophase separation and transport, but each individual study is often focused on only a single architecture. Cationic multiblock copolymers have also been investigated previously, but the step-growth mechanism used to construct these chains used in previous studies does not enable precise control over the number of block segments in the final polymer. Thus, there is a need to further determine the specific role of architecture in performance of block copolymers, including polynorbornenes and other polymers, in determined functionality in AEMs and/or other uses thereof. For example, the balance required between cation content and water uptake in AEM provides an opportunity to improve AEM materials through rational design.

In a number of representative embodiments hereof, sequential buildup of representative cation functionalized (for example, trimethylammonium-functionalized) polynorbornene copolymers were investigated (for example, diblock to pentablock), and the properties were juxtaposed with an analogous statistical copolymer. Controlled or living vinyl addition polymerization of norbornenes was used to control the number of blocks and ionic groups in the final polymer.

The polynorborene copolymers, which were prepared with near identical ion-exchange capacities (IECs), revealed a number of important features. In the case of ammonium-functionalized norbornene polymers, block copolymers were more conductive as compared to statistical copolymers. In the case of cations of relatively small volume (that is, those cations having a volume less than 0.25 $cm^3/mol$ such as ammonium cations, conductivity and swelling can be tuned simply by choice of multiblock, and water uptake is dependent on whether ionic segments act as peripheral or internal blocks within the polymer chain. Without limitation to any mechanism, in the case of cation of relatively large volume (that is, those cations having a volume of at least 0.25 $cm^3/mol$, such as phosphonium cations and imidazolium cations), an increase in the number of $H_2O$ molecules solvating the cation results in a better combination of conductivity and swelling in statistical copolymers. Although, the polymer membranes hereof are discussed in the context of use as AEMs for fuel cells and electrolyzers, the polymers hereof may be used in other technologies such as in membranes for water purification.

The word "control" and/or "controlled" as used herein means that if the polymerization process conditions are selected so that the contributions of the chain breaking processes are insignificant compared to chain propagation, then synthesis of polymers with predetermined molecular weights, low polydispersity and site specific functionalities become a reality. A controlled polymerization process displays the following features: 1. First-order Kinetic Behavior;

2. Pre-determinable Degree of Polymerization; 3. Designed (Usually) Narrow Molecular Weight Distribution; and 4. Long-lived Polymer Chain with Preserved End Functionalities. Controlled vinyl addition polymerization is, for example, discussed in Kim, D, et al., "Living Vinyl Addition Polymerization of Substituted Norbornenes by a t-Bu₃P-Ligated Methylpalladium Complex", *ACS Macro Lett.*, 4, 3, 327 (2015), the disclosure of which is incorporated herein by reference. In general, it is desirable that monomer purities in the polymerizations hereof be 99% or greater.

A number of representative studies hereof include the copolymerization of 2-alkyl and 2-haloalkyl functionalized norbornenes (Bicyclo[2.2.1 ]hept-2-enes) and their post-functionalization with cationic moieties for use in alkaline exchange membrane fuel cells (AEMFCs). These polymers can be synthesized by metal-catalyzed cationic addition polymerization to yield a rigid bicyclic backbone with the pendant substituents attached to provide processability in commercial solvents and a handle for further functionalization. One of the hallmarks of this polymerization is that it displays living or controlled behavior. The polymerization results in polymer molecular weight that can be controlled by the monomer-to-catalyst ratio with narrow molecular weight distributions. In a number of embodiments, the dispersity ($M_w/M_n$) is less than 1.5. In a number of such embodiment, the dispersity is in the range of 1.1 to L.5. This attribute warrants the use of metal-catalyzed vinyl addition polymerization in the synthesis of block copolymers to provide sequential addition of two (or more) different monomers to form one polymer chain containing 'blocks' of different molecular identities. The synthetic methodologies hereof provide the ability to synthesize both statistical and multiblock poly(norbornene)s that are: 1) easily functionalized from an array of precursors to form polycations; 2) high molecular weight; 3) well suited for forming films; 4) solution processible; and 5) high-performance anion/hydroxide conductors. Specific attention can be paid to the change in hydroxide conductivity with the number of blocks in the multiblock architecture.

Figure 8A:
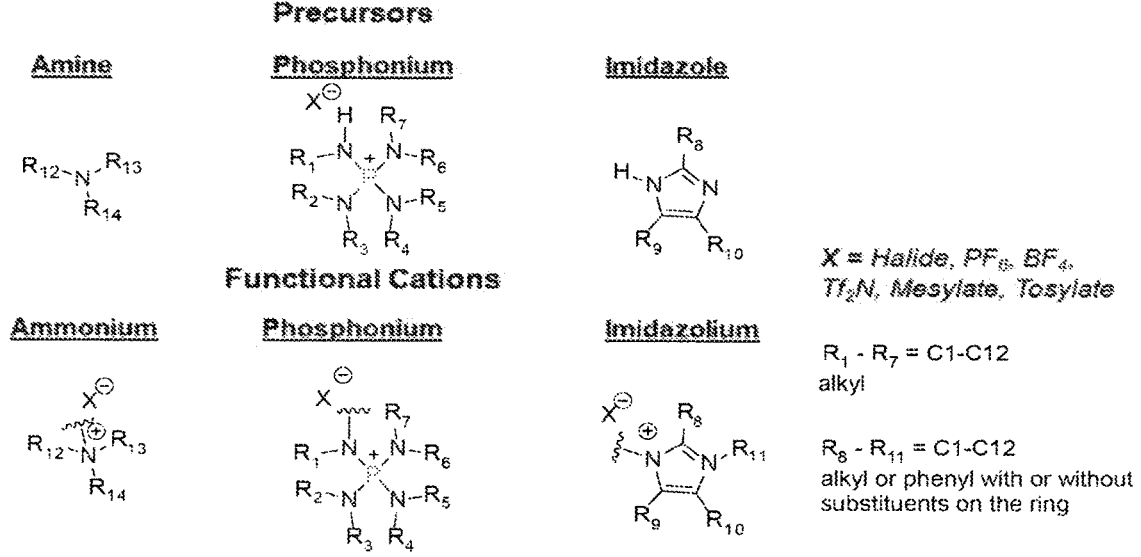
FIG. 8A illustrates representative precursors (top) to be used in post-polymerization functionalization to yield the corresponding cationic moieties (bottom) tethered to addition polynorbornene backbone of representative copolymers hereof by way of SN2 reaction.

FIG. 1A outlines an embodiment of a process hereof for synthesizing a representative statistical norborene copolymer and creating a film or membrane to be used in, for example, hydroxide transport. Once synthesized by, for example, palladium-catalyzed vinyl addition polymerization, these polymers may be solvent-cast into robust, free-standing films which can then undergo functionalization by submerging into a solution of a precursor to form the cationic-functionalized polymer film. The cationic-functionalize polymer film is further used for the measurement of hydroxide conductivity. Success of the procedure is shown in ¹H NMR of the film before and after immersion in a trimethylamine solution in which the protons adjacent to the bromide (3.4 ppm) shift and a larger peak emerges (3.2 ppm) due to the presence of the ammonium functionality. This process is modular, as several precursors may be used to yield cationic polymers on the same polymer backbone, utilizing SN2 chemistry on the polymer, which enables direct comparison of functional group performance in, for example, AEMFCs. Representative classes of cations (and precursors) suitable for use herein including ammonium, phosphonium, and imidazolium cations are illustrated in FIG. 8A, which is discussed further below.

Vinyl addition polynorbomenes provide an archetypal polyolefin platform for use in the studies hereof since they possess high thermal stability, high glass transition temperatures, good optical transparency, and they are excellent film formers. Substituted norbornenes can be polymerized in a controlled fashion using, for example, tBu₃PPd(Me)Cl as a catalyst and using sodium tetrakis[3,5-bis(trifluoromethyl) phenyl]borate (BArF) (see FIGS. 1A through 1C) as an activator. In general, palladium phosphine catalysts with a halide ligand are suitable for use in a number of embodiments of the controlled vinyl-addition polymerizations hereof. The halide can be abstracted using sodium tetrakis [3,5-bis(trifluoromethyl)phenyl]borate or other activators such as silver hexafluoroantimonate or lithium tetrakis(pentafluorophenyl)borate ethyl etherate. The synthetic method hereof results in well-defined polymers with good control over molecular weight and molecular weight distribution. Hexyl norbornene (hNB) and bromobutylnorbornene (Br-BuNB) were employed as two representative olefinic comonomers to assure good film forming properties of the resulting polymers.

Figure 1C:
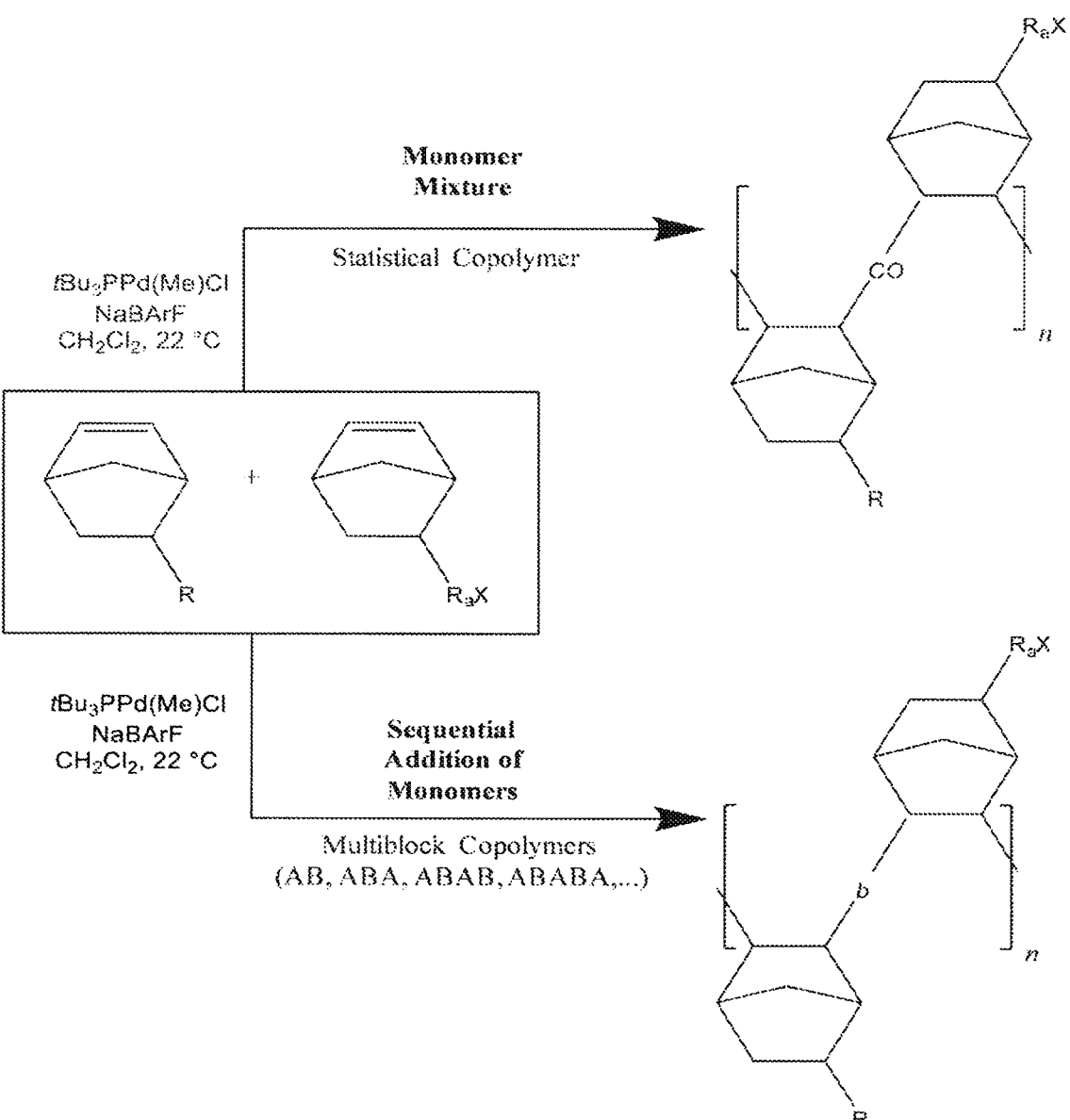
FIG. 1C illustrates a generalized scheme for synthesis of statistical and multiblock intermediate olefinic/norbornene copolymers hereof via controlled vinyl addition polymerization, which may subsequently be reacted with a precursor for a cationic group to form cationic-functionalized norbornene copolymers.

As mentioned above, the addition polymerization of polynorbornene used herein is controlled and can therefore produce block copolymers. An important component of embodiments hereof is the ability to synthesize multiblock polymer architectures in a controlled manner such that the multiblock polymers have similar ionic incorporations and molecular weights to compare properties such as hydroxide conductivities. FIG. 1B illustrates a representative synthetic scheme for synthesizing representative statistical and multiblock copolymers by vinyl addition polymerization. FIG. 1C illustrates a generalized synthetic scheme for synthesizing representative statistical and multiblock intermediate copolymers hereof by vinyl addition polymerization which may be reacted with precursors for cationic groups to form cationic-functionalized norbornene copolymers. R and Ra in, FIG. 1C, are C1-C20 alkyl group (and, more typically, C1-C12) alkyl groups. Such alkyl groups can be linear, branched and/or cyclic alkyl groups. FIG. 1D illustrates Table 1 setting forth characterization of representative statistical as well as diblock, triblock, tetrablock and pentablock ammonium-functionalized copolymers hereof.

Achieving sufficiently high molecular weight (measured relative to polystyrene standards) is important in the preparation of flexible free-standing films from hNB. As such, all materials synthesized in this work were well above the predicted chain entanglement molecular weight for the homopolymer poly(5-n-hexylnorbornene (Table 1, Entries 1-5). See, Muller, K et al., "Synthesis and Rheological Properties of Poly(5-n-hexylnorbornene)," *Macromol. Chem. Phys.* 2006, 207, 193-200. Molecular weight of the statistical and block copolymers hereof was determined using size-exclusion chromatography (gel permeation chromatography) relative to polystyrene standards in tetrahydrofuran. The molecular weight characterization was completed for the intermediate copolymer (that is, prior to the addition of the cationic groups). In general, the relatively high molecular weights of the cationic-functionalized copolymers hereof may eliminate the need to crosslink the polymer chains hereof in a number of embodiments. However, the polymer chains of the cationic-functionalized copolymers hereof may be crosslinked. As set forth above, light crosslinking is has been shown to reduce water uptake in cationic-functionalized copolymers (for example, using 2.5 to 20% of a crosslinking agent such as N,N,N,N-tetramethyl-1,6-hexanediamine (TMHDA) or another crosslinking agent). See, for example, Mandal, M .; Huang. G .; Kohl, P. A., Anionic Multiblock Copolymer Membrane Based on Vinyl Addition Polymerization of Norbornenes: Applications in Anion-Exchange Membrane Fuel Cells. *J. Membrane Sci.* 2019, 570-571, 394-402; and Mandal, M .; Huang, G .; Kohl, P. A., Highly Conductive Anion-Exchange Membranes Based on Cross-Linked Poly(norborene): Vinyl Addition Polymerization. *ACS Appl. Energy Mater.* 2019, 2, 2447-2457.

Copolymerization of hNB:BrBuNB (2:1) was carried out with the same molar ratios in all instances, to afford copolymers with near identical content of the bromo functional group. This ensured that each polymer would have the same theoretical ion-exchange capacity (IEC) upon substitution with, for example, trimethylamine. The incorporation of BrBuNB was verified by integration of the methylene bromide signal (3.4 ppm) relative to the methyl group of the hexyl chain (0.9 ppm) in the $^1$H NMR spectrum of the synthesized polymers. This value was typically within approximately 3-5% of the expected value based on stoichiometry of the two initial monomer feeds.

Two variations of polymerization were carried out as illustrated in the synthetic schemes of FIGS. 1B and 1C. For the statistical copolymer, both monomers (hNB and BrBuNB) were combined directly with the activated catalyst solution. For the multiblock polymers, monomers were fed into the reaction sequentially, alternating between hNB (A block) and BuBrNB (B block). In that regard, monomer A is added first and consumed fully. Then monomer B is added etc. until the desired number of blocks are achieved. Monomer consumption was monitored using $^1$H NMR spectroscopy for each chain extension. GPC analysis was used to ensure that the polymer chain lengths increased as expected after each monomer feed (see FIG. 2B and 2C. Good yield (70-85%) of the final materials was obtained in all cases. FIG. 2A shows the representative example of synthesizing a pentablock copolymer from 2-hexyl norbornene and 2-bromobutyl norborene. FIG. 2B illustrates size exclusion chromatograms (SECs) via GPC showing the increase in molecular weight with every block added to the pentablock copolymer of FIG. 2A. FIG. 2C illustrates size exclusion chromatograms for each of the diblock, triblock, tetrablock and pentablock copolymers described in Table 1 of FIG. 1C hereof. Increasing the number of blocks decreased the molecular weight of each individual block, as catalyst concentrations were held constant for each experiment. A high molecular weight shoulder was observed in some chromatograms, along with tailing in the low molecular region, but neither of these features caused issues with the chain extension.

The copolymers of hNB and BrBuNB were soluble in conventional organic solvents, and free-standing films or membranes were obtained by solution casting from CHCl$_3$ (see FIG. 3). The reaction of NMe$_3$ with the alkyl bromide side chains was achieved by soaking polymer films in a 28% (w/v) solution of aqueous NMe: at room temperature for 48 h. The resultant trimethyl ammonium polymers (Br$^-$ form) were soluble in 1:1 CHCl$_3$CH$_3$OH, and H NMR spectroscopy was used to confirm the loss of the —CH$_2$—Br signal (3.4 ppm) and the appearance of the N—CH$_3$ signal at 3.00 ppm. The solution processability of these films is advantageous as tetraalkylammonium polymers are oftentimes completely insoluble and difficult to characterize. In addition, the films were transparent and could be mechanically deformed without any loss of integrity (see FIG. 3).

Once synthesized, functionalized, and converted to the hydroxide form, the films underwent hydroxide conductivity measurements via a four-point probe apparatus as known in the art. FIGS. 4A and 4C shows the resulting conductivity of the trimethylammonium functionalized multiblock copolymer series of Table 1. The results demonstrate a trend that is dependent on the total number of blocks in the multiblock copolymer. In that regard, with increasing number of blocks, the hydroxide conductivity is increased while maintaining the same ratio of ionic block to insulating block throughout the series. The results indicate that with one composition of polymer, the hydroxide conductivity increases significantly when increasing from diblock to pentablock architectures. No other relevant literature has explicitly detailed this effect of increasing number of blocks in addition poly(norborene)s. An increase in conductivity is noted for the block copolymers as compared to the statistical copolymer (FIG. 3—Right). The conductivity of the Stat-NMe$_3$ at 80° C. is 61±2 whereas for the diblock-NMe$_3$ the value is 79±3. The pentablock-NMe$_3$ was the most conductive copolymer in the series, with a σ=98±2 at 80° C.

Water uptake for the different copolymers ranged from 30-85% for the series (see FIG. 4B). Another trend was observed wherein copolymers with an odd number of blocks had lower water uptakes than copolymers with an even number of blocks. The diblock and tetrablock copolymers have ionic segments flanking one end of the polymer chain which likely leads to increased interchain ionic interactions, and higher water uptakes. By contrast, and without limitation to any mechanism, the lower uptakes in the triblock and pentablock are believed to be a function of the insulating chains at the periphery, which limits swelling. This result indicates ionic chains are best flanked by insulating blocks, to control water uptake in phase separated block copolymers. In other words, to limit water uptake, it is desirable to have an odd number of blocks wherein the first and last blocks (or the outer, flanking blocks) are insulating (non-ionic) blocks. The hydration number trends upward in a similar pattern as the water uptake (Table 1). The statistical copolymer also produced the lowest water uptake in the series, suggesting larger incorporation of the cation should improve the conductivity.

Small angle X-ray scattering (SAXS) was then performed to better understand the change in behavior with conductivity for the series. SAXS analysis was carried out on as-cast dehydrated films in the Br form in pinhole geometry (see top panels of FIG. 5) and narrow slit, large q range collimation modes. In both instances, the scattering patterns for the block copolymers were in good agreement and revealed the presence of distinct first and second order Bragg features, indicating periodic nanoscale phase separation. As expected, the Bragg peaks were absent in the statistical copolymer SAXS patterns (see FIG. 5, top right panel). The most obvious trend for the multiblock series is the decrease in d-spacing with increasing number of blocks. A 65 nm spacing is observed for the diblock copolymer which is reduced to less than 30 nm for the pentablock copolymer (FIG. 5, top panels).

Without limitation to any mechanism, it was hypothesized that the increase of hydroxide conductivity in the multiblock copolymers with the increase of the number of blocks is caused by the concomitant increase of the surface area to volume ratio of the ionic domains. Progressing from diblock to pentablock copolymers, the same ionic content is becoming confined to smaller volumes during microphase separation and therefore an increase in surface area to volume ratio affords better networks for ion-transport.

Figure 5:
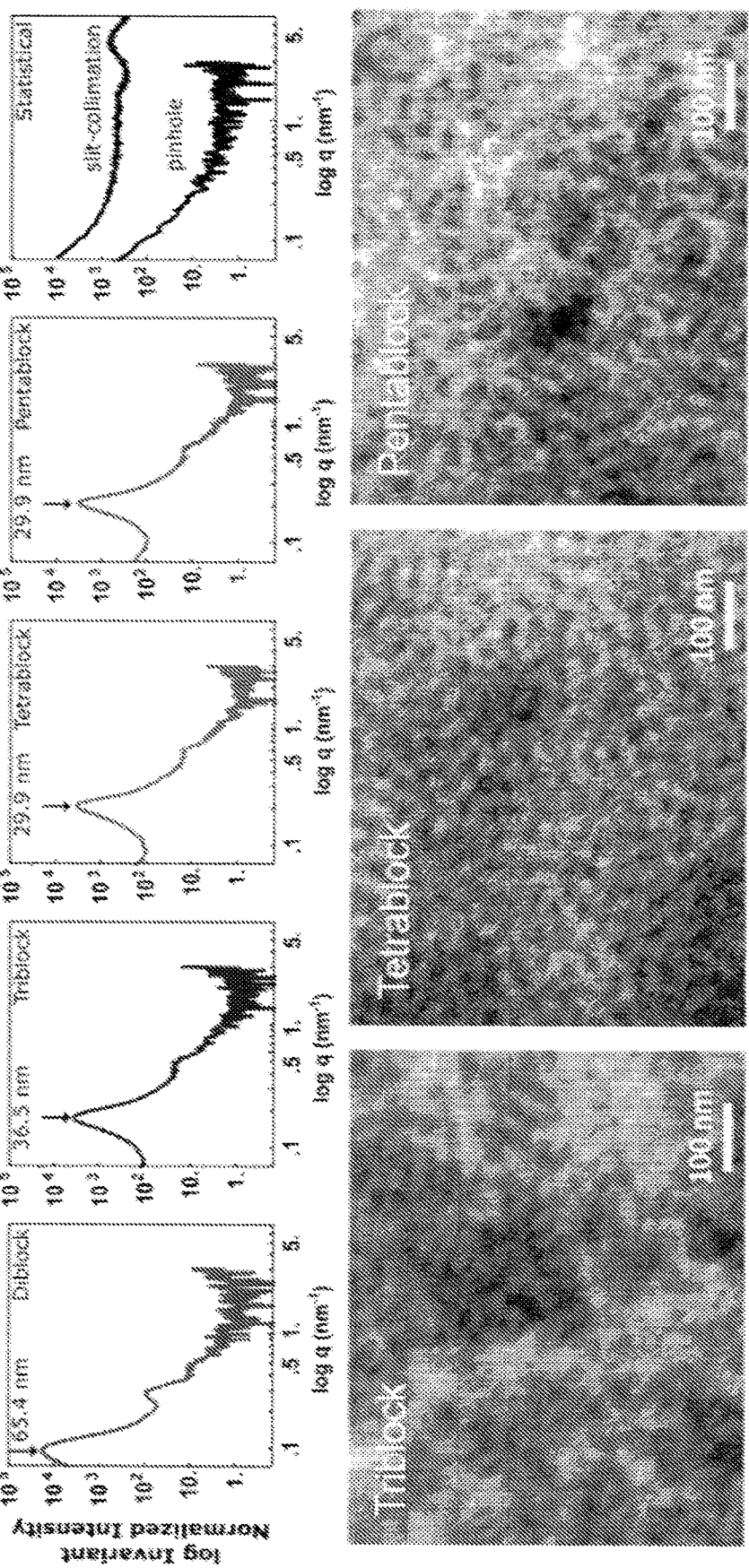
FIG. 5 illustrates, in the top panels thereof, small angle X-ray scattering (SAXS) patterns acquired at 22° C. for the multiblock and statistical copolymer films in pinhole geometry and, in the bottom panels thereof, Cryo-TEM images of the triblock, tetrablock and pentablock copolymers taken at an accelerating voltage of 200 keV.

The statistical copolymer showed no Bragg features over the entire q-range due to the absence of periodic microphase separation (top right panel of FIG. 5). Close inspection of the high q range of the statistical copolymer traces acquired in a slit collimation mode revealed the presence of a distinct change of slope in the approximately 2 nm$^{-1}$ range. This feature was interpreted as the indication of the short-range, aperiodic clustering of ionic groups. Similar clustering has been observed in a recent study of phosphonium-based statistical copolymers. Characteristic broad maxima centered approximately 5 nm$^{-1}$ evident in all instances for slit-collimated patterns correspond to the low q tails of amorphous halos of all copolymers.

The triblock, tetrablock and pentablock copolymers were imaged using cryogenic transmission electron microscopy to further probe morphology (see FIG. 5, bottom panels). The specimens were prepared using cryo-microtomy and the use of cryogenic temperatures kept the membrane structure intact during the cutting and imaging processes. The diblock and statistical copolymers were not as amenable to sectioning. No staining was required as the Br$^{-1}$ counterion provided sufficient contrast to map the ionic (dark regions) and insulating domains (light regions) for the three copolymers. The images of the tetrablock and pentablock are consistent with a disordered bicontinuous morphology. Conclusions regarding the specific morphology of the triblock were more difficult. Ordering length scales determined using fast-Fourier transform (FFT) are relatively close to the SAXS analysis for the tetrablock (32-40 nm by TEM, 29.9 nm domains by SAXS) and pentablock (28-34 nm by TEM, 29.9 nm by SAXS). There is a slightly larger difference in the values obtained for the triblock by TEM and SAXS (22-31 nm by TEM, 36.5 nm by SAXS) which could be due to the larger anisotropy of the sample.

As described above, the present synthetic methodology is modular with respect to the cation tethered to the polymer backbone. Considering the high hydroxide conductivity and controllable water uptake of the ammonium-functionalized polynorbornenes, other cations were appended to the representative polymer framework described above. In that regard, resonance-stabilized tetraaminophosphonium cations were studied given their exceptional stability to alkaline media. The preparation of a statistical and pentablock phosphonium copolymer was accomplished using a post-polymerization modification as described herein.

Figure 6:
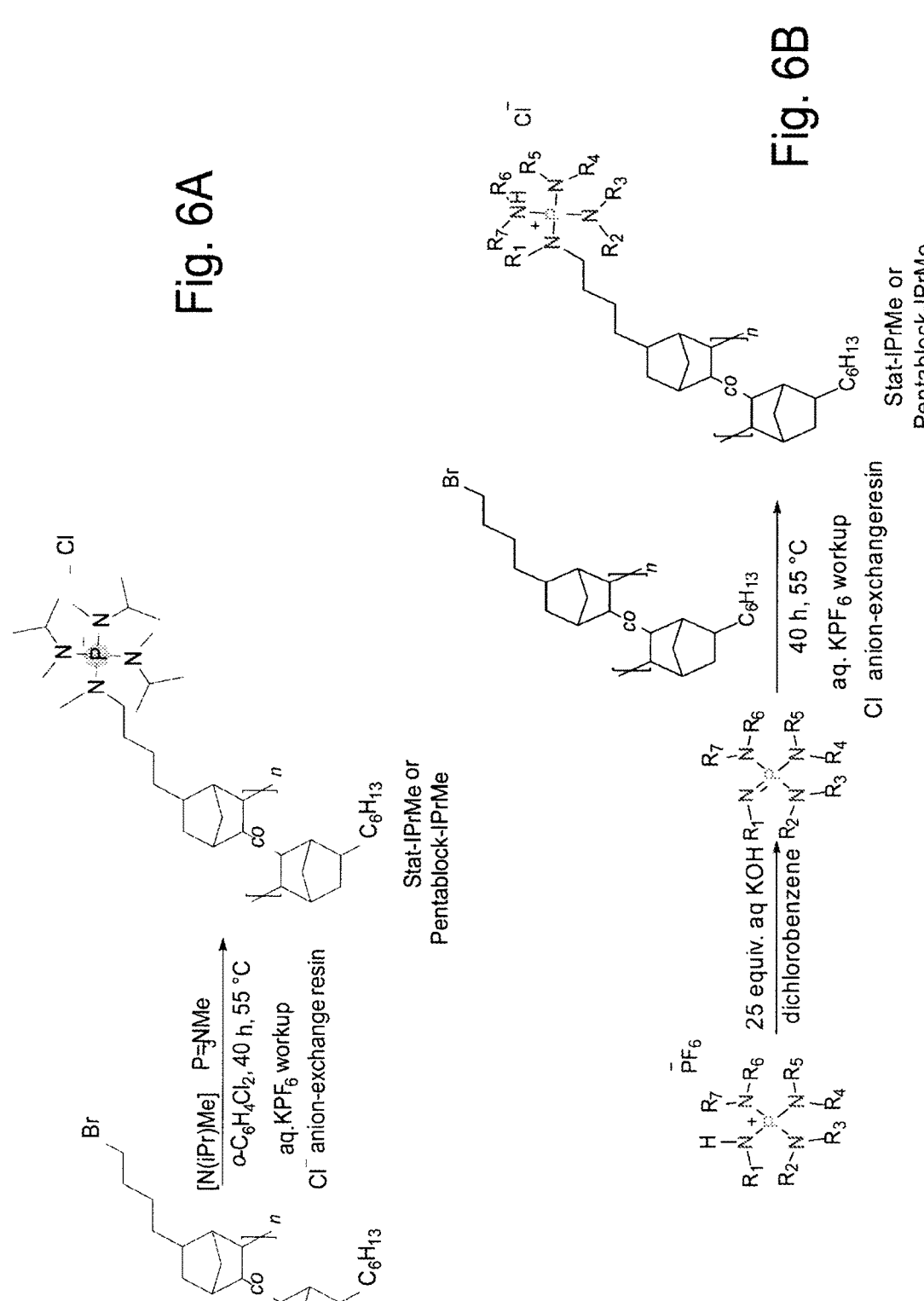
FIG. 6A illustrates post-polymerization modification of the polynorbornene copolymers hereof with a tetraaminophosphonium cation.
FIG. 6B illustrates further details of the post-polymerization modification of the polynorbornene copolymer with a tetraaminophosphonium cation.
FIG. 6C illustrates a graph of water uptake and hydration values for trimethylammonium and tetraaminophosphonium copolymers hereof, wherein water uptake was determined using gravimetric analysis and hydration values were determined by the equation $\lambda=[1000\times WU]/[IEC\times 18]$.
FIG. 6D illustrates a graph of conductivity (σ) for trimethylammonium and tetraaminophosphonium copolymers at room temperature and at 80° C., wherein σ was determined in the OH form using electrochemical impedance spectroscopy (EIS) and the error is the standard deviation over 3 measurements.

A trisaminophosphazene [N(iPr)Me]$_3$P═N—Me precursor was combined with the hNB/BrBuNB copolymers in dichlorobenzene for 40 h at 55° C. under N$_2$ (see FIG. 6A). In the case of the ammonium copolymers described above, the film in the bromide form is soaked in an aqueous trimethylamine solution. Reactions for phosphonium precursors and imidazolium precursors are discussed further below. In the case of a phosphonium precursor, a phosphazene base (an intermediate precursor) is formed via a phase-transfer reaction. The trisaminophosphazene can be conveniently prepared from its protonated form using a two-phase reaction (see, for example, FIG. 6B). The phosphazene is then combined with the copolymer under nitrogen to substitute the polymer with the desired phosphonium cation. The resultant cationic-functionalized copolymers (statistical and pentablock-IPrMe copolymers) were worked up using potassium hexafluorophosphate (KPF$_6$) and converted into the desired chloride form using a commercially available anion-exchange resin. Solvent casting from 1,2-dichloroethane produced homogeneous films.

The degree of substitution was estimated from $^1$H NMR spectroscopy. The N—Me groups bound to the phosphonium appear between δ 2.5-2.8 ppm. These were compared to the CH$_3$ group of the hNB which appears as a broad signal at δ 0.9 ppm. The integration of the CH$_3$ group of the hNB norbornene as compared to the phosphonium signals are within 10% of the target value and suggest >90% conversion to the Stat-IPrMe and Pentablock-IPrMe. For example, in a 2:1 hNB-co-BrBuNB, the ratio of signals for the N—Me groups of the phosphonium to the methyl group of hNB should be 12:6 with a 10.5:6 ratio observed in the $^1$H NMR spectrum characterizing the polymer.

The water uptake and conductivity measurements for these phosphonium polymers indicated a much larger impact of the bulkier phosphonium cation as compared to its ammonium (NMe$_3$) counterpart as illustrated in FIGS. 6C and 6D. First, upon looking at the Stat-NMe$_3$ and the Stat-IPrMe in FIG. 6C, the water uptake and hydration number are quite different. The water uptake for the Stat-IPrMe is twice that of the Stat-NMe$_3$ (60% as compared to 30%). The hydration number, which takes ion-exchange capacity into account, illustrates that the phosphonium cation is solvated by nearly 3 times the number of H$_2$O molecules as compared to the ammonium (28 versus 10). This is consistent for the occupied volume for each cation. If the monomeric NMe$_4$Cl and [(N(iPr)Me)$_4$P]Cl salts are compared and assumed to have similar densities (approximately 1.2 g/cm$^3$), at equimolar concentrations the phosphonium cation will occupy approximately 3.2 times the volume of the ammonium cation. Considering this observation, the hydration number for the Stat-IPrMe, which is nearly 3 times larger than for the Stat-NMe$_3$, appears to be associated with the occupied volume of the cation. The water uptake is exacerbated in the pentablock copolymer. The pentablock-NMe$_3$ has a water uptake of 75%, while pentablock-IPrMe water uptake is approximately double the water uptake of the pentablock-NMe$_3$ at approximately 150%.

The conductivities of the Stat-IPrMe and Pentablock-IPrMe were also quite interesting as illustrated in FIG. 6D. A 15% increase in conductivity is noted for the pentablock copolymer as compared to the statistical copolymer (63±3 and 53±5 at 80° C., respectively). This increase is markedly lower than the increase observed in the ammonium copolymers, wherein a 40% increase in conductivity was noted from the statistical to the pentablock copolymer. Without limitation to any mechanism, this result may be attributed to the significant water uptake of the Pentablock-IPrMe, which may limit its potential as an AEM. Conductivity measurements for the pentablock-IPrMe were more difficult due to the larger degree of swelling. For phosphonium-based polymers (and other polymers including relatively large volume or bulky cations), certain block copolymers may prove difficult for use in certain technologies as the higher hydration of such bulky cations (for example, cations having a volume in excess of 0.25 cm$^3$/mol, such as phosphonium cations and imidazolium cations) may result in water management issues.

FIG. 7 illustrates a representative synthetic scheme for post-polymerization modification of the polynorbornene copolymers hereof with an imidazolium cation. In the representative scheme of FIG. 7, an imidazole precursor is attached to the intermediate copolymer formed via vinyl addition polymerization using phase-transfer chemistry. The imidazole is then converted into the imidazolium via a nucleophilic substitution.

As set forth above, a series of representative trimethylammonium-functionalized copolymers, including statistical and multiblock (ranging from deblock to pentablock) copolymers, were synthesized by controlled vinyl addition polymerization and post-polymerization functionalization. This group of polymers enabled systematic exploration of the impact of multiblock architecture on hydroxide transport (for copolymer of a given molecular weight and cation content). The block copolymers displayed higher hydroxide conductivity that the statistical copolymer, suggesting they should be valuable as high-performance hydroxide transporting membranes.

Additionally, the modular method of post-polymerization functionalization hereof was used to append resonance-stabilized tetraaminophosphonium cations to the statistical and pentablock copolymers. Direct comparison with the ammonium copolymers revealed significantly higher water uptake with these bulky cations appended to the polymer chain, which may be associated with a larger occupied volume. In the case of bulkier cations (for example, having a volume in equal to or in excess of 0.25 cm$^3$/mol), in which water uptake will be higher, statistical copolymers may be more effective than block copolymers to mitigate excessive swelling in, for example, polymers/membranes hereof.

In a number of embodiments, the devices, systems, methods, and compositions hereof thus provide a systematic process of synthesis, development, and utilization of statistical and multiblock addition poly(norbornene)s in a number of technologies including, for example, alkaline fuel cells which has not been previously realized. The devices, systems, methods, and compositions hereof provide high performing hydroxide conductors. Furthermore, the polymers provide the distinct advantage of being solution processible, which allows for more control over the characterization and film forming processes. With careful preparation, large increases in the conductivity of a single polymer and for a give cation may be realized by synthesis of multiblock or statistical architectures in addition polynorbornene scaffolds.

Furthermore, the synthetic methods and representative series of copolymers studied herein serves as a valuable model set to understand the impact of statistical and multiblock architecture on performance and properties in anion-exchange membranes. The studies hereof indicated that in controlled vinyl addition norbornenes, phase separation can be used as a tool to enhance conductivity, particularly in the case of relatively low-volume cations (for example, having a volume less than 0.25 cm$^3$/mol), such as ammonium cations. Synthesized statistical trimethylammonium-functionalized copolymers hereof also displayed relatively good conductivity (61 mS/cm at 80° C. ). In the case of larger-volume cations (for example, having a volume greater than or equal to 0.25 cm$^3$/mol) such as phosphonium and imidazolium cations, statistical polymers may outperform multiblock copolymers considering the design criteria of hydroxide conductivity and water uptake. The design strategies for hydroxide-containing polymers hereof provide a framework for the development of a variety of polymers for robust and efficient anion exchange membranes including a variety of cationic groups as discussed further below.

Figure 8B:
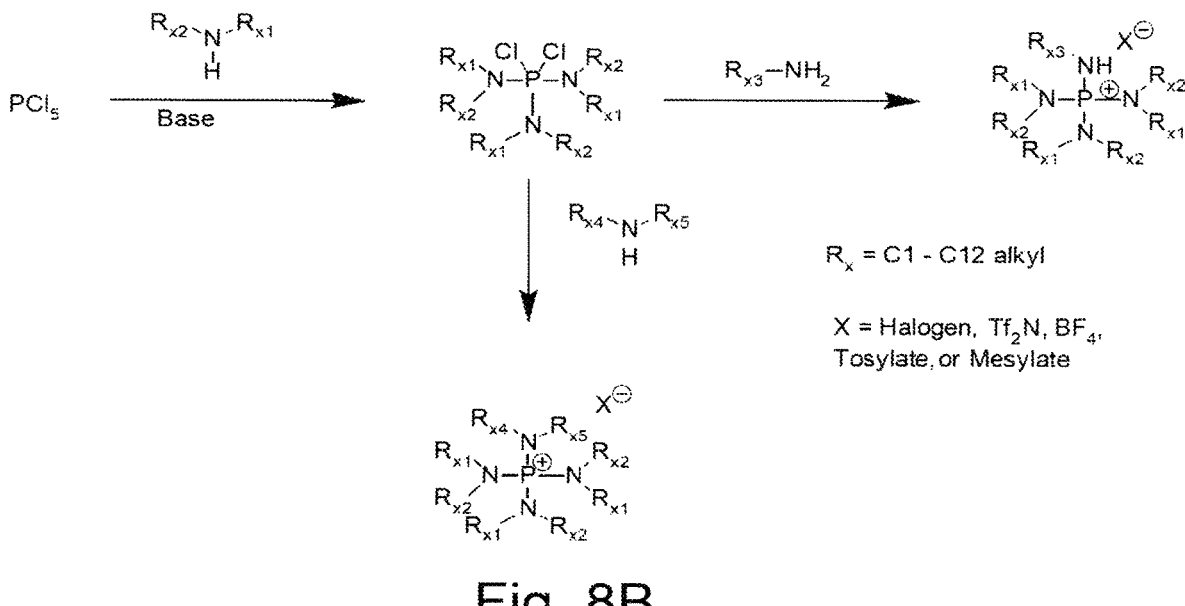
FIG. 8B illustrates an embodiment of a one-pot or single-reaction-vessel synthesis of tetrakis(dialkylamino) phosphonium cations.

As described above, FIG. 8A illustrates representative precursors (top) which may be used in post-polymerization functionalization to yield the corresponding cationic moieties (bottom; either directly or through one or more intermediate compositions) tethered to addition polynorbornene backbone of representative copolymers hereof by way of SN2 reaction. FIG. 8B illustrates an embodiment of a single-reaction-vessel or one-pot synthesis of tetrakis(dialkylamino) phosphonium cations. The novel one-pot synthesis of the phosphonium compounds may, for example, be used to prepare precursors for the post-polymerization functionalization of vinyl addition polyolefin/polynorbornene scaffold as described above. In a number of embodiments, the synthetic method includes two consecutive additions of appropriate amines to yield tetrakis(dialkylamino) phosphonium cations. Previous syntheses of tetrakis(dialkylamino)

phosphonium cations included reaction of alkyl azides with phosphorus trichloride followed by alkylation and amine substitution of phosphorus pentachloride followed by a separate alkylation step. The synthetic method hereof uses secondary amines rather than primary amines followed by alkylation. FIG. 8B illustrates the synthesis of tetrakis (dialkylamino) phosphonium compounds starting from substitution of commercially available phosphorus pentachloride with three equivalents of a secondary amine in the presence of an organic base to react with HCl byproduct. Upon completion of reaction, monitored by P NMR spectroscopy, a second amine (primary or secondary; typically primary) is added to complete conversion to the tetrakis (dialkylamino) phosphomium cation which is isolated by simple precipitation. The synthetic method hereof provides significant advantages over a number of previous methods as it is a one-pot procedure that gives both high yields (>80%) and a readily isolable crystalline material. Moreover, the present synthetic method is not limited to synthesis of monomeric phosphonium units. With judicious choice of a diamine during the second step of the synthesis, dimeric phosphonium compounds become available. In general, one of the R groups on the P atom is tunable. Such a tunable R group is denoted as R; in the scheme of FIG. 6B. In a number of embodiments, a methyl group was used, but this group could be a higher-order linear, branched, or cyclic alkyl group as well. Dimeric phosphonium compounds are, for example, of potential use in polymeric systems as crosslinking moieties that allow for an increased amount of ionic content while also mitigating the amount of swelling in the overall crosslinked polymer system.

The tetrakis(dialkylamino) phosphonium compounds may, for example, be especially useful for polymer functionalization in the application of AEMFCs as they provide a robust base stable material with modest hydroxide conductivity. In stability experiments, a family of tetrakis(dialkylamino) phosphonium cations were subjected to extremely harsh alkaline environments to analyze decay pathways. It was found that these compounds required the addition of phase-transfer agents to observe significant degradation. There are numerous examples of tetrakis(dialkylamino) phosphonium cations in aqueous alkaline environments as small molecules and pendent to polymer backbones that display very little to no degradation behavior. As a result of this extreme resistance to alkaline degradation these materials show very good promise for hydroxide transport.

Experimental

Materials and Methods. Tri-tert-butylphosphine palladium (II) methyl chloride was synthesized according to a literature procedure.[1] Yamashita, M., Takamiya, L., Jin, K., and Nozaki, K. "Syntheses and Structures of Bulky Monophosphine-Ligated Methylpalladium Complexes: Application to Homo- and Copolymerization of Norbornene and/or Methoxycarbonylnorbornene" *Organometallics,* 2006, 25, 4588-4595. DOI: 10.1021/om060347w; the disclosure of which is incorporated herein by reference. All polymerizations were carried out in dry, degassed CH$_2$Cl$_2$. All chemicals were purchased from commercially available sources and were used as received.

NMR Analysis. All NMR spectra were collected at 300 K on a two-channel Bruker Avance III NMR instrument equipped with a Broad Band Inverse (BBI) probe, operating at 500 MHz for $^1$H and 126 MHz for $^{13}$C. The $^1$H NMR spectra are referenced to residual protio solvents (7.26 ppm for CHCl$_3$).

Gel-Permeation Chromatography. GPC measurements were performed on a Waters Instrument equipped with a 717 plus autosampler, a Waters 2414 refractive index (RI) detector and two SDV columns (Porosity 1000 and 100000 Å; Polymer Standard Services) with THF as the eluent (flow rate 1 mL/min, 40° C.). A 10-point calibration based on polystyrene standards (Polystyrene, ReadyCal Kit, Polymer Standard Services) was applied for determination of molecular weights.

Ion Exchange Capacity. IEC was measured using standard back titration methods. The thin film membrane in the Cl⁻ form was added to 100 ml of 1 M NaOH in a Nalgene bottle for 24 h. The NaOH solution was quickly decanted from the membrane and 25 ml of fresh deionized water was added. After soaking for 20 min, the solution was quickly decanted and replaced with another fresh portion of deionized water. This process was repeated a total of three times to wash of residual NaOH. The solution was decanted from the membrane and subsequently replaced with 25 ml of standardized 0.1 N HCl solution and allowed to soak for another 24 h. The resulting acidic solution was titrated to pH 7 with standardized 0.1 N NaOH using an Accumet AB15 pH meter and the volume used was recorded. Three control titrations of 25 mL of standardized 0.1 N HCl were performed using standardized 0.1 N NaOH and the volume used to obtain pH=7 was recorded. An average of the three titrations were used as the true concentration of the NaOH solution. The difference in volume between the control titrations and the membrane titration was used to calculate the IEC using the following equation:

$$IEC\left(\frac{mmol}{g}\right) = \frac{\left[(V_{control} - V_{membrane}) \times \left(\frac{100 \ mmol \ NaOH}{1000 \ mL \ solution}\right)\right]}{membrane \ weight}$$

A sample calculation is given below for the statistical copolymer:
mL of NaOH for membrane solution to reach pH=7: 27.4 mL.

$$IEC\left(\frac{mmol}{g}\right) =$$

$$\frac{\left[(28.5 - 27.4 \ mL \ NaOH) \times \left(\frac{100 \ mmol \ NaOH}{1000 \ mL \ NaOH \ solution}\right)\right]}{0.064 \ g} = 1.71 \frac{mmol \ OH}{g}$$

Electrochemical Impedance Spectroscopy. Conductivity was measured by four probe electrochemical impedance spectroscopy (EIS) using a Scribner Membrane Conductivity Clamp and a Bio-Logic SP-150 Potentiostat. The thin film membrane in the Cl⁻ form was cut to dimensions of approximately 20 mm×5 mm. The membrane thickness varied, but nearly all measured samples were near 0.07 mm in thickness. Membrane strips were soaked in 50 mL of 1 M NaOH in a Nalgene bottle for 24 h at 50° C. The NaOH solution was replaced a total of three times throughout the full 24 hours to ensure complete conversion to the hydroxide form. The NaOH solution was quickly decanted from the membrane and 50 mL of fresh deionized water was added. After soaking for 20 mins, the solution was quickly decanted and replaced with another fresh portion of deionized water. This process was repeated for a total of three times. The thin film membrane, now in the OH⁻ form, was quickly assembled in the conductivity clamp and submerged in fresh deionized water at 20° C. that was degassed under N₂ for 1 hour prior to use to avoid conversion of OH_ to carbonates.

EIS was performed by applying a sinusoidal (AC) voltage of 10 mV across the membrane sample at frequencies between 800,000 Hz and 0.1 Hz (scanning from high to low frequency) and measuring the current response. The Nyquist plot data was extrapolated to find the x-axis intercept, which gives the value of real impedance for the membrane sample. This value was then used to calculate hydroxide conductivity through the following formula:

$$\sigma = \frac{L}{Z'WT}$$

Where L is the length between the electrodes (0.425 cm), Z' is real value of impedance taken at the zero-point in the imaginary impedance before the onset of Warburg impedance. W is the membrane width, and T is the membrane thickness as measured with a digital micrometer.

Thermal Gravimetric Analysis. TGA was performed using a Perkin Elmer Pyris thermogravimetric analyzer. All experiments were carried out under N₂ atmosphere starting from 50° C. and ending at 800° C. with a rate of 10° C./min. The polymer was preheated to 100° C. for 1 h before each run to drive off any existing water or solvent.

Small Angle X-ray Scattering. SAXS was performed on two separate systems. System 1: Thin film membranes in the bromide form were mounted on a sample holder. SAXS was performed on a Ganesha SAXS-LAB (UMass Amherst) with Cu Kα 0.154 nm line on SAXS mode with pin hole beam collimation. For each sample the exposure time was set for 30 min. All data collected was background subtracted from a set of reference data collected for the same amount of time and using the same holder with no sample. System 2: Thin film membranes in the bromide form were mounted on a membrane sample holder. SAXS was performed on an Anton Parr SAXess (UPitt) Cu Kα 0.154 nm line with slit collimation. For each sample the exposure time was set for 10 min. All data collected was background subtracted from a set of reference data collected for the same amount of time and using the same holder with no sample.

Cryogenic Transmission Electron Microscopy. Sectioning of the triblock, tetrablock and pentablock copolymers for cryo-TEM was performed using cryo-microtomy on a Leica EM UC7/FC7 Cryo-Ultra-microtome. The samples were cooled to temperatures between −60 to −95° C. and cut into ~70 nm thick sections using a diamond knife. These sections were then collected using copper TEM grids with lacey carbon support and stored at room temperature. Cryo-TEM images of the grids were taken on a Thermo Fisher Talos Arctica microscope operated at an accelerating voltage of 200 keV and using a Gatan K3 direct electron detector. The microscope was operated at a temperature of −190° C. and in energy-filtered mode using a 20 eV energy slit. Images for the triblock, tetrablock, and pentablock copolymers were recorded at defocus values between −1 and −5 μm.

Synthesis of 5-hexyl-2-norbornene. The synthesis of this molecule was carried out similar to a reported procedure by Claverie and coworkers[2.] Dicyclopentadiene (2.0 g. 15.1 mmol, 2.04 mL) and 1-octene (6.8 g, 60.4 mmol, 9.5 mL, 4.0 equivalents) were added to a 125 mL pressure vessel equipped with a magnetic stir bar. The solution was heated to 190° C. in an oil bath, for 24-48 h. The experiment was monitored by removing aliquots from the reaction mixture and analyzing using ₁H NMR spectroscopy. The reaction was carried out until no residual dicyclopentadiene was observed. The solution was cooled to room temperature and was connected to a vacuum distillation apparatus. Residual 1-octene was removed by distillation (oil bath temperature was 60-65° C.) at ~1-2 torr. Upon removal of the residual dienophile, the oil bath temperature was raised to 105-110° C. to distill the product (the first 1 mL was discarded). The resultant transparent oily liquid still contained higher order Diels-Alder adducts (tetracyclododecene) so column chromatography on silica gel using hexanes as the eluent was used to separate the desired product. Some co-elution of the product with the tetracyclododecene occurred, so only the initial pure fractions were collected for use in polymerization. The solvent was removed by rotary evaporation and the product was further dried in vacuo to give the pure product as a transparent oil. Yield 1.5 g. 28%. endo/exo: 87/13. $_1$H NMR (500 MHz, CDCl$_3$) endo peaks δ ppm: 6.10 (dd, J=5.8, 3.0 Hz, 1H), 5.91 (dd, J=5.7, 2.9 Hz, 1H), 2.86-2.57 (m, 2H), 1.50-1.11 (m, 12H), 1.15-1.01 (m, 2H), 0.89 (t, J=7.0 Hz, 3H), 0.49 (ddd, J=11.2, 4.4, 2.6 Hz, 1H). $^{13}$C NMR endo peaks (126 MHZ, CDCl$_3$) δ ppm: 137.0, 132.7, 49.8, 45.6, 42.7, 38.9, 35.0, 32.6, 32.1, 29.8, 28.9, 22.9, and 14.3.

Synthesis of 5-Bromobutyl-2-norbornene. The synthesis of this molecule was carried out like a reported procedure by Espinet and coworkers. Martínez-Arranz, S., Albéniz, A. C., and Espinet, P. "Versatile Route to Functionalized Vinylic Addition Polynorbornenes" *Macromolecules,* 2010, 43 (18), 7482-7487 DOI:10.1021/ma101137z, the disclosure of which is incorporated by reference. Dicyclopentadiene (2.0 g. 15.1 mmol, 2.04 mL) and 6-bromo-1-hexene (9.86 g, 60.5 mmol, 8.08 mL, 4.0 equivalents) were added to a 125 mL pressure vessel equipped with a magnetic stir bar. The solution was heated to 190° C. in an oil bath, for 24-48 h. The experiment was monitored by removing aliquots from the reaction mixture and analyzing using $^1$H NMR spectroscopy. The reaction was carried out until no residual dicyclopentadiene was observed. The solution was cooled to room temperature and was connected to a vacuum distillation apparatus Residual 6-bromo-1-hexene was removed by distillation (oil bath temperature was 70-75° C.) at ~1-2 torr. Upon removal of the residual dienophile, the oil bath temperature was raised to 140-145° C. to distill the product (the first 1 mL was discarded). The resultant transparent oily liquid still contained higher order Diels-Alder adducts (tetracyclododecene) so column chromatography on silica gel using hexanes as the eluent was used to separate the desired product. Some co-elution of the product with the tetracyclododecene occurred, so only the latter pure fractions were collected for use in polymerization. The solvent was removed by rotary evaporation and the product was further dried in vacuo to give the pure product as a transparent oil. Yield 2.7 g, 40%. endo/exo: 81/19 $^1$H NMR (500 MHz, CDCl$_3$) endo peaks δ ppm: 6.11 (dd, J=5.8, 3.0 Hz, 1H), 5.91 (dd, J=5.7, 2.9 Hz, 1H), 3.39 (t, J=6.9 Hz, 2H), 2.83-2.70 (m, 2H), 1.97 (m, 1H), 1.90-1.74(m, 3H), 1.54-1.25 (m, 3H), 1.23-1.17 (m, 1H), 1.15-1.01 (m, 2H), 0.49 (ddd,J=11.3, 4.4,2.6 Hz, 1H), endo peaks $^{13}$C NMR (126 MHZ, CDCl$_3$) δ ppm: 137.2, 132.4, 49.7, 45.5, 42.7, 38.8, 34.0, 33.2, 32.6, 31.8, 27.3.

General Procedure for Polymerizations. Statistical Copolymer: In a N$_2$ glovebox, sodium tetrakis[3,5-bis(trifluoromethyl)phenyl]borate (0.003 g. 0.0036 mmol) was added to an oven-dried 20 mL scintillation vial. Dry CH$_2$Cl$_2$ (10 mL) and 1 mL of a 1 mg/mL stock solution of tri-tert butylphosphine palladium (II) methyl chloride (0.001 g, 0.0036 mmol) were then added to the vial. The reaction mixture was stirred for 15 min to ensure formation of the active cationic palladium catalyst. A solution of 5-hexyl-2-norbornene (0.3 g, 1.68 mmol) and 5-bromobutyl-2-norbornene (0.192 g. 0.84 mmol) in CH$_2$Cl$_2$ (1 mL) was then injected into the activated catalyst solution. The polymerization reaction was stirred for 2 h, at which time an aliquot was removed for crude analysis by $^1$H NMR spectroscopy to ensure complete consumption of the two monomers (disappearance of the vinyl protons). The solution was then quenched by precipitation into a large excess of methanol to yield an off-white stringy polymer. Yield 0.38 g, 77%, GPC (THE vs PS standards) M$_n$: 125 kg/mol, Đ: 1.17. $^1$H NMR (CDCl$_3$) δ ppm: 3.4 (s, br 2H, —CH$_2$—Br), 2.6-0.96 (br, all other protons except for hexyl norbornene —CH$_3$), 0.89 (s, br 3H, —CH$_2$—CH$_3$).

Block Copolymers: The following is the synthetic protocol for the diblock copolymer. The multiblock copolymers were synthesized in a similar manner by sequential additions of 5-hexyl-2-norbornene and 5-bromobutyl-2-norbornene. In a N$_2$ glovebox, sodium tetrakis[3,5-bis(trifluoromethyl) phenyl]borate (0.007 g. 0.0075 mmol) was added to an oven-dried 50 mL round-bottom flask. Dry CH$_2$Cl$_2$ (15 mL) and a 0.9 mL of a 3 mg/mL stock solution of tri-tert butylphosphine palladium (II) methyl chloride (0.0027 g. 0.0075 mmol) were then added to the vial. The reaction mixture was stirred for 15 min to ensure formation of the cationic palladium catalyst. A solution of 5-hexyl-2-norbornene (0.62 g, 3.5 mmol) in dry CH$_2$Ch$_2$ (2 mL) was then injected into the activated catalyst solution. The polymerization was stirred for 1 h, at which time an aliquot was removed for crude analysis by $^1$H NMR spectroscopy to ensure complete consumption of the hexyl norbornene monomer (disappearance of the vinyl protons). A solution of 5-bromobutyl-2-norbornene (0.4 g, 1.74 mmol) was then injected into the active polymer solution and was stirred for 2 h. Another aliquot was removed to ensure complete consumption of 5-bromobutyl-2-norbornene. The polymer was then quenched by precipitation into a large excess of methanol to yield an off-white stringy polymer. Yield 0.84 g, 82%. GPC (THF vs PS standards) Block 1 M$_n$: 58 kg/mol, Đ: 1.11, Block 2 M$_n$: 104 kDa, Đ: 1.16. $^1$H NMR (CDCl$_3$) δ ppm: 3.4 (s, br 2H, —CH$_2$—Br), 2.6-0.96 (br, all other protons except for hexyl norborene —CH$_3$), 0.88 (s, br 3H, —CH$_2$—CH$_3$).

ABA Triblock: Yield 0.86 g. 87% $^1$H NMR (CDCl$_3$) δ ppm: 3.4 (s, br 2H, —CH$_2$—Br), 2.6-0.96 (br, all other protons except for hexyl norbornene —CH$_3$), 0.88 (s, br 3H, —CH$_2$—CH3). Block 1 M$_n$: 31 kDa, Đ: 1.18, Block 2 M$_2$: 68 kDa, Đ: 1.16, Block 3 M$_n$: 100 kDa, Đ: 1.18.

ABAB Tetrablock: Yield 0.79 g, 81% $^1$H NMR (CDCl$_3$) δ ppm: 3.4 (s, br 2H, —CH$_2$—Br), 2.6-0.96 (br, all other protons except for hexyl norbornene —CH$_3$), 0.89 (s, br 3H, —CH$_2$—CH3). Block 1 M$_n$: 29 kDa, Đ: 1.17, Block 2 M$_n$: 51 kDa, Đ: 1.15, Block 3 M$_n$: 82 kDa, Đ: 1.16, Block 4 M$_n$: 118 kDa, Đ: 1.18.

ABABA Pentablock: Yield 0.75 g, 76% $^1$H NMR (CDCl$_3$) δ ppm: 3.4 (s, br 2H, —CH$_2$—Br), 2.6-0.96 (br, all other protons except for hexyl norbornene —CH$_3$), 0.88 (s, br 3H, —CH$_2$—CH$_3$). Block 1 M$_n$: 22 kDa, Đ: 1.19, Block 2 M$_n$: 44 kDa, Đ: 1.18, Block 3 M$_n$: 68 kDa, Đ: 1.17, Block 4 M$_n$: 91 kDa, Đ: 1.38. Block 5 M$_n$: 112 kDa, Đ: 1.38.

Solution casting to afford flexible free-standing membranes. Approximately 150 mg of polymer was dissolved in 5 mL of chloroform. Upon complete dissolution, the solution was filtered through a 0.22 μm syringe filter onto a glass petri dish (diameter—5 cm). The chloroform evaporated over a period of 4-5 h to afford a clear film, which was removed from the dish by swelling with MeOH. The polymer was then dried in vacuo to remove MeOH and any other residual solvents.

Synthesis of Trimethylammonium-Functionalized Polymers. The dried polymer films were immersed in an aqueous solution of 28% (w/v) trimethylamine for 48 h at room temperature. The films were removed and rinsed 5×50 mL portions of deionized water and 3×10 mL portions of MeOH. The films were then dried in vacuo to produce the trimethylammonium-functionalized polymers.

TMA-Statistical: $^1$H NMR (CDCl$_3$: MeOD 1:1) δ ppm: 3.0 (s, br 9H, TMA —CH$_3$), 2.5-0.76 (br, all other protons except for hexyl norborene —CH$_3$), 0.66 (s, br 3H, —CH$_2$—C$\underline{H}_3$)

TMA-Diblock: $^1$H NMR (CDCl$_3$: MeOD 1:1) δ ppm: 3.0 (s, br 9H, TMA —CH$_3$), 2.5-0.76 (br, all other protons except for hexyl norbomene —CH$_3$), 0.66 (s, br 3H, —CH$_2$—C$\underline{H}_3$) Becoming insoluble at room temperature. TMA-ABA Triblock: $^1$H NMR (CDCl$_3$: MeOD 1:1) δ ppm: 3.0 (s, br 9H, TMA —CH$_3$), 2.50-0.76 (br, all other protons except for hexyl norbornene —CH$_3$), 0.65 (s, br 3H, —CH$_2$—C$\underline{H}_3$).

TMA-ABAB Tetrablock: Insoluble.

TMA-ABABA Pentablock: Insoluble.

Synthesis of Tetraaminophosphonium Polymer. Tris(isopropyl-(methyl)amino)(methylamino)phosphonium hexafluorophosphate(V) (1.00 g, 2.37 mmol) was dissolved in 1,2-dichlorobenzene (10 mL) and combined with 6.6 g of 50% (w/w) KOH$_{aq}$ in a scintillation vial. The vial was heated to 60° C. for 30 min to deprotonate the N—H group and produce the neutral trisaminophosphazene base ([N(iPr)Me]3P=N—Me). The water layer was removed, the organic phase was dried using Na$_2$SO$_4$, and filtered through celite. The clear 1,2-dichlorobenzene solution with dissolved phosphazene was combined with the 2:1 copolymer of the hexylnorbornene-bromobutylnorbornene (400 mg, either statistical or pentablock) and placed in a heating block at 55° C. under an N$_2$ atmosphere for 40 h. The reaction mixture was then removed from the glovebox and transferred to a separatory funnel where it was diluted with 50 ml of 1,2-dichloroethane and washed with a saturated KPF$_6$ solution (3×50 mL). The organic layer was then dried with anhydrous sodium sulfate, concentrated using rotary evaporation and dichlorobenzene was removed by evaporation. The polymer was then dissolved in a 1:1 solution methanol/1,2-dichloroethane solution (50% v/v) and 8 g of ion exchange resin was added. The slurry was gently stirred for 17 h and, afterwards, the resin was removed using vacuum filtration and the solution was concentrated using rotary evaporation. $^{31}$P NMR can be used to monitor the disappearance of the PF$_6^-$ anion, if the exchange is incomplete, resin and solvent can be re-added to product to continue the exchange process. Yield 50%. $^1$H NMR (CDCl$_3$) δ ppm: 3.46 (s, br 3H), 2.87 (s, br 2H), 2.71 (s, br 3H), 2.59 (s, br 9H), 2.6-0.96 (br, all other protons except for hexyl norbornene —CH$_3$), 0.89 (s, br 6H).

Electrochemical Impedance Spectroscopy (EIS)—Nyquist Plots, Sample calculation for conductivity:

$$\sigma\left(\frac{mS}{cm}\right) = \frac{L}{Z'WT} \times 1000$$

L is the length between electrodes=0.425 cm, Z' is the real value of impedance measured at the minimum of complex impedance Z", W is the average width of the film=0.5 cm, and T is the average thickness of the film=0.0067 cm.

$$\sigma\left(\frac{mS}{cm}\right) = \frac{0.425 \text{ cm}}{4631 \text{ Ohms} \times 0.5 \text{ cm} \times 0.0067 \text{ cm}} \times 1000 = 27.4\frac{mS}{cm}$$

The values set forth are an average conductivity value for three trials conducted using the same polymer film.

The foregoing description and accompanying drawings set forth a number of representative embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. A multiblock, ammonium-functionalized norbornene copolymer formed by a process comprising: performing a controlled vinyl addition polymerization in the presence of a metal catalyst of a first norbornene monomer substituted with a first alkyl group and at least a second norbornene monomer substituted with a second alkyl group by adding a predetermined amount of the first norbomene monomer and a predetermined amount of the second norbornene monomer sequentially to the reaction to form blocks of an intermediate norbornene multiblock copolymer, the second alkyl group comprising a substituent which undergoes a substitution reaction with a tertiary precursor of an ammonium cationic group, and reacting the tertiary precursor for the ammonium cationic group with the intermediate norbornene multiblock copolymer to form the multiblock, ammonium-functionalized norbornene copolymer, wherein the first alkyl group is a C1-C20 alkyl group and the second alkyl group is a C1-C20 alkyl group, and wherein the multiblock, ammonium-functionalized norbornene copolymer comprises an odd number of blocks and wherein a first block and a last block of the multiblock, ammonium-functionalized norbornene copolymer are formed from the first norbornene monomer.

2. The multiblock, ammonium-functionalized norbornene copolymer of claim 1 wherein the substituent of the second alkyl group is a halo atom, a mesylate group, or tosylate group.

3. The multiblock, ammonium-functionalized norbornene copolymer of claim 2 wherein the first alkyl group is a C1-C12 alkyl group and the second alkyl group is a C1-C12 alkyl group.

4. The multiblock, ammonium-functionalized norbornene copolymer of claim 2 wherein the intermediate norbornene multiblock copolymer has a number average molecular weight above the entanglement molecular weight thereof.

5. The multiblock, ammonium-functionalized norbomene copolymer of claim 2 wherein the ammonium-functionalized norbornene copolymer has a polydispersity less than 1.5.

6. The multiblock, ammonium-functionalized norbomene copolymer of claim 2 wherein the multiblock, ammonium-functionalized norbornene copolymer includes no cross-links.

7. The multiblock, ammonium-functionalized norbornene copolymer of claim 4 wherein the multiblock, ammonium-functionalized norbornene copolymer is solution processible.

8. A method of synthesizing a multiblock, ammonium-functionalized norbornene copolymer comprising: performing a controlled vinyl addition polymerization in the presence of a metal catalyst of a first norbornene monomer substituted with a first alkyl group and at least a second norborene monomer substituted with a second alkyl group by adding a predetermined amount of the first norborene monomer and a predetermined amount of the second norbornene monomer sequentially to the reaction to form blocks of an intermediate norbornene multiblock copolymer, the second alkyl group comprising a substituent which undergoes a substitution reaction with a tertiary amine precursor of an ammonium cationic group, and reacting the tertiary amine precursor for the ammonium cationic group with the intermediate norbornene multiblock copolymer to form the multiblock, ammonium-functionalized norbornene copolymer, wherein the first alkyl group is a C1-C20 alkyl group and the second alkyl group is a C1-C20, and wherein the multiblock, ammonium-functionalized norbornene copolymer comprises an odd number of blocks and wherein a first block and a last block of the multiblock, ammonium-functionalized norborene copolymer are formed from the first monomer.

9. The method of claim 8 wherein the substituent of the second alkyl group is a halo atom, a mesylate group, or tosylate group.

10. The method of claim 8 wherein the first alkyl group is a C1-C12 alkyl group and the second alkyl group is a C1-C12 alkyl group.

11. The method of claim 8 wherein the intermediate norbornene multiblock copolymer has a number average molecular weight above the entanglement molecular weight thereof.

12. The method of claim 11 wherein the multiblock, ammonium-functionalized norbornene copolymer has a polydispersity less than 1.5.

13. The method of claim 11 wherein the multiblock, ammonium-functionalized norbornene polymer includes no crosslinks.

14. The method of claim 11 wherein the multiblock, ammonium-functionalized norbornene copolymer is solution processible.

15. The method of claim 14 further comprising casting a film of the multiblock, ammonium-functionalized norbornene copolymer from solution.

16. A membrane formed from solution casting of a multiblock, ammonium-functionalized norbornene copolymer formed by a process comprising: performing a controlled vinyl addition polymerization in the presence of a metal catalyst of a first norbornene monomer substituted with a first alkyl group and at least a second norbornene monomer substituted with a second alkyl group by adding a predetermined amount of the first norbornene monomer and a predetermined amount of the second norbornene monomer sequentially to the reaction to form blocks of an intermediate norbornene multiblock copolymer, the second alkyl group comprising a substituent which undergoes a substitution reaction with a tertiary precursor of an ammonium cationic group, and reacting the tertiary precursor for the ammonium cationic group with the intermediate norborene multiblock copolymer to form the multiblock, ammonium-functionalized norbornene copolymer, wherein the first alkyl group is a C1-C20 alkyl group and the second alkyl group is a C1-C20 alkyl group, and wherein the multiblock, ammonium-functionalized norbornene copolymer comprises an odd number of blocks and wherein a first block and a last block of the multiblock, ammonium-functionalized norbornene copolymer are formed from the first norbornene monomer.

\* \* \* \* \*